US00RE42068E

(19) United States
(12) Reissued Patent
Klein et al.

(10) Patent Number: US RE42,068 E
(45) Date of Reissued Patent: Jan. 25, 2011

(54) METHOD AND APPARATUS FOR REDUCING CO-CHANNEL INTERFERENCE IN A FRAME-SYNCHRONIZED WIRELESS COMMUNICATION SYSTEM

(76) Inventors: Israel Jay Klein, 5260 Fiore Ter., Apt. 214, San Diego, CA (US) 92122; Sheldon L. Gilbert, 132 Nina Ct., Los Gatos, CA (US) 95030; Rami Hadar, 5361 Renaissance Ave., San Diego, CA (US) 92122

(21) Appl. No.: 11/377,891

(22) Filed: Mar. 16, 2006

(Under 37 CFR 1.47)

Related U.S. Patent Documents

Reissue of:
(64) Patent No.: 6,707,798
Issued: Mar. 16, 2004
Appl. No.: 09/539,851
Filed: Mar. 31, 2000

(51) Int. Cl.
*H04Q 7/00* (2006.01)

(52) U.S. Cl. ..... 370/280; 370/281; 370/277; 370/329; 370/330; 455/446; 455/447

(58) Field of Classification Search ..... None
See application file for complete search history.

(56) References Cited

U.S. PATENT DOCUMENTS

| | | | |
|---|---|---|---|
| 5,228,029 | A | 7/1993 | Kotzin |
| 5,257,398 | A | 10/1993 | Schaeffer |
| 5,301,188 | A | 4/1994 | Kotzin et al. |
| 5,408,496 | A | 4/1995 | Ritz et al. |
| 5,420,851 | A | 5/1995 | Seshadri et al. |
| 5,448,753 | A | 9/1995 | Ahl et al. |
| 5,485,463 | A | 1/1996 | Godoroja |
| 5,517,503 | A | 5/1996 | Hess |
| 5,594,720 | A | 1/1997 | Papadoloulos et al. |
| 5,668,610 | A | 9/1997 | Bossard et al. |
| 5,768,254 | A | 6/1998 | Papadopoulos et al. |
| 5,774,790 | A | 6/1998 | Dupuy |
| 5,903,826 | A | 5/1999 | Nowak |
| 5,974,323 | A | 10/1999 | Doner |
| 6,006,069 | A | 12/1999 | Langston |
| 6,016,311 | A | 1/2000 | Gilbert et al. |

(Continued)

FOREIGN PATENT DOCUMENTS

| | | | |
|---|---|---|---|
| EP | 0720405 | A2 * | 7/1996 |
| EP | 0720405 | A | 7/1996 |
| WO | 9938343 | A | 7/1999 |
| WO | 9939532 | A | 8/1999 |
| WO | 0001188 | A | 1/2000 |

OTHER PUBLICATIONS

International Search Report mailed Oct. 22, 2001, for PCT Application No. PCT/US01/10243.

(Continued)

*Primary Examiner*—Anh-Vu Ly
(74) *Attorney, Agent, or Firm*—Schwabe, Williamson & Wyatt, P.C.

(57) ABSTRACT

The present invention is a method and apparatus for reducing co-channel interference. The present invention includes a powerful means for eliminating co-channel interference from base stations in a wireless communication system. The present co-channel interference reducing method and apparatus utilizes frame synchronization between selected time frames (e.g., odd and even time frames) to reduce co-channel interference. Advantageously, the present invention reduces co-channel interference and, thus, allows robust modulation schemes to operate even at worst case line-of-sight (LoS) interference scenarios of 100%. The present invention can also use an uplink/downlink ratio formula to further improve system capacity (i.e., reduce co-channel interference) in ATDD systems. The present inventive method and apparatus can be used in any type of frame based and frame synchronized communication system.

34 Claims, 10 Drawing Sheets

U.S. PATENT DOCUMENTS

| | | | | |
|---|---|---|---|---|
| 6,016,313 | A | 1/2000 | Foster, Jr. et al. | |
| 6,038,455 | A | 3/2000 | Gardner et al. | |
| 6,256,486 | B1 * | 7/2001 | Barany et al. | 455/296 |
| 6,327,254 | B1 | 12/2001 | Chuah | |
| 6,339,708 | B1 | 1/2002 | Wang | |
| 6,400,697 | B1 * | 6/2002 | Leung et al. | 370/328 |
| 6,405,044 | B1 | 6/2002 | Smith et al. | |
| 6,407,993 | B1 | 6/2002 | Moulsley | |
| 6,493,331 | B1 | 12/2002 | Walton et al. | |
| 6,553,011 | B1 * | 4/2003 | Yan et al. | 370/328 |
| 2002/0058513 | A1 * | 5/2002 | Klein et al. | 455/63 |
| 2002/0186710 | A1 | 12/2002 | Alvesalo et al. | |
| 2007/0111665 | A1 * | 5/2007 | Klein et al. | 455/63.2 |

OTHER PUBLICATIONS

International Preliminary Examination Report mailed Jul. 10, 2002, for PCT Application No. PCT/US01/10243.

Office Action mailed Aug. 6, 2004, for Chinese Application No. 01810473.8.

Office Action mailed Jan. 26, 2007, for Chinese Application No. 200510106967.9.

Office Action mailed Sep. 7, 2007, for Chinese Application No. 200510106967.9.

Office Action mailed Apr. 25, 2008, for Chinese Application No. 200510106967.9.

Rejection Decision mail May 8, 2009, for Chinese Application No. 200510106967.9.

Papadopoulos, et al., "Reduction of Mixed Co–Channel Interference in Microcellular STDD Systems", IEEE, (1995), pp. 759–763.

Office Action mailed May 8, 2003 for U.S. Appl. No. 09/539,851.

Reexamination Notification issued Apr. 30, 2010 for Chinese Application No. 200510106967.9.

Reexamination Decision for Chinese Application No. 200510106967.9, dated Sep. 16, 2010, 16 pages.

* cited by examiner

METHOD AND APPARATUS FOR REDUCING CO-CHANNEL INTERFERENCE IN A FRAME-SYNCHRONIZED WIRELESS COMMUNICATION SYSTEM

Matter enclosed in heavy brackets [ ] appears in the original patent but forms no part of this reissue specification; matter printed in italics indicates the additions made by reissue.

CROSS-REFERENCE TO RELATED APPLICATIONS

This invention is related to commonly assigned U.S. Pat. No. 6,016,311, by Gilbert et al., issued Jan. 18, 2000, entitled "Adaptive Time Division Duplexing Method and Apparatus for Dynamic Bandwidth Allocation within a Wireless Communication System", and U.S. Pat. No. 6,038,455, by Gardner et al., issued Mar. 14, 2000, entitled "Reverse Channel Reuse Scheme in a Time Shared Cellular Communication System", both patents hereby incorporated by reference herein for their teachings on wireless communication systems in general, and specifically for their teachings of Adaptive TDD techniques and frequency re-use techniques, respectively.

BACKGROUND OF THE INVENTION

1. Field of the Invention

This invention relates to communication systems, and more particularly to a method and apparatus for reducing co-channel interference in a frame-synchronized wireless communication system.

2. Description of Related Art

A wireless communication system facilitates two-way communication between a plurality of subscriber radio stations or subscriber units (either fixed or portable) and a fixed network infrastructure. Exemplary systems include mobile cellular telephone systems, personal communication systems (PCS), and cordless telephones. The objective of these wireless communication systems is to provide communication channels on demand between the subscriber units and the base station in order to connect the subscriber unit user with the fixed network infrastructure (usually a wired-line system). In the wireless systems using multiple access schemes, frames of time are the basic transmission unit. Each frame is divided into a plurality of slots of time. Some time slots are used for control purposes and some time slots are used for information transfer. Information is typically transmitted during time slots in the frame where the time slots are assigned to a specific subscriber unit. Subscriber units typically communicate with the base station using a "duplexing" scheme that allows for the exchange of information in both directions of connection.

Transmissions from the base station to the subscriber unit are commonly referred to as "downlink" transmissions. Transmissions from the subscriber unit to the base station are commonly referred to as "uplink" transmissions. Depending upon the design criteria of a given system, the prior art wireless communication systems have typically used either time division duplexing (TDD) or frequency division duplexing (FDD) methods to facilitate the exchange of information between the base station and the subscriber units. Both the TDD and FDD duplexing schemes are well known in the art. Exemplary wireless communication systems using these schemes are described in more detail in the related U.S. Pat. No. 6,038,455, by Gardner et al., issued Mar. 14, 2000, entitled "Reverse Channel Reuse Scheme in a Time Shared Cellular Communication System", which has been incorporated by reference herein for its teachings on wireless communication systems.

Some communication systems do not use time frames in communicating between the base station and their respective and associated subscriber units (or "terminal stations" in Broadband Wireless Access (BWA) communication systems). For example, BWA systems based on cable modem technologies do not use time frames when communicating on either the uplink or the downlink. Therefore, these systems do not allow for frame synchronization between base stations and disadvantageously do not permit coordination between the base stations for purposes of reducing co-channel interference. Similarly, un-synchronized TDD systems allow different communication cells within the system to be "free running", in that different cells and sectors within the system operate on frames that are not synchronized in time.

Wireless communication systems rely upon frequency re-use because frequency allocation or bandwidth is typically limited. For example, in cellular communication systems and broadband wireless systems, geographic areas or regions are typically divided into cells that are nominally hexagonally or square shaped. As described in U.S. Pat. No. 6,038,455, each cell or sector is allocated one or more radio frequency channels. For example, in a cellular communication system utilizing frequency division multiple access (FDMA), adjacent or nearby cells are assigned separate frequencies. After all available frequencies have been allocated, it is necessary to begin reusing the frequencies. For example, if four frequencies are available, it is necessary to begin using the first frequency again starting in the fifth cell. Due to the nature of the systems described in the incorporated U.S. Pat. No. 6,038,455, and in PCS, cellular and paging systems of the prior art, frequency re-use cannot be used as aggressively as it can be used in BWA systems. For example, in PCS/cellular/paging systems, typically only a fraction of the frequency spectrum is used per cell. In contrast, in BWA, frequency re-use can be much more aggressive (for example, a frequency can be re-used at least once per cell, with multiple sectors).

FIG. 1a is a simplified diagram of an exemplary broadband wireless configuration showing frequency re-use. In broadband wireless communications, a plurality of base stations 1 communicate with fixed terminal stations.(i.e., "subscriber units"). As shown in FIG. 1a, clusters of four sectors 4 surrounding base stations 1 (1a–1d) form cells 2 (2a–2d). The cells 2 are shown as being separated by the bold lines 30 and 32. In BWA systems, a cell 2 typically comprises either four or six sectors 4. In the case of four sectors 4, the coverage area covered by the cell is square (as shown in FIG. 1a). In the case of six sectors, the coverage area covered by the cell is hexagonal (as exemplified in FIG. 6 described below).

Thus, each cell 2 has an associated and corresponding base station 1. For example, cell 2a has an associated and corresponding base station 1a. Cell 2b has an associated and corresponding base station 1b, and so on. Each base station 1 typically includes an array of sectored antennas for communicating with the terminal stations within the cells 2. In accordance with broadband wireless technology, a sectored antenna is typically 60 or 90 degrees in beamwidth for commnunicating with terminal stations within an entire sector. Thus, in a four-sector case, a base station 1a comprises at least four sectored antennas, one antenna per sector 4 (4a–4d). In a six-sector case, the base station comprises six sectored antennas. Each sector contains a plurality of terminal stations that communicate with the base station 1a on a unique radio frequency (RF) channel.

In broadband wireless systems, each terminal station utilizes a highly directional antenna (typically less than 3 degrees beamwidth) for communicating with its associated base station 1. The highly directional antenna is fixed and pointed toward the associated base station 1. The base station's sectored antenna receives energy from any terminal station operating on the same RF channel and is positioned on a line of sight relative to the sectored antenna. Line of sight (LoS) is defined herein as an unobstructed (first Fresnel zone clear) radio wave propagation path between a transmitting antenna and a receiving antenna. On the downlink, a base station's 1 sectored antenna transmits energy on an RF channel to a terminal station's highly directional antenna. On the uplink, a terminal station's highly directional antenna transmits energy on an RF channel to a base station's 1 sectored antenna.

In accordance with frequency re-use methodologies and techniques, a set of RF channels is allocated for use in each cell 2 (for example, cells 2a, 2b, 2c and 2d). As shown in FIG. 1a, for example, each cell 2 utilizes a set of four orthogonal RF channels (A, A', B, and B') comprising two frequencies (A and B) wherein each frequency has two different polarizations (designated by the "non-primed" and "primed" indicators). Each sector 4 (4a–4d) of a cell 2 therefore utilizes a different orthogonal RF channel for communication between terminals in the sector and an associated sector base station (i.e., a terminal in sector 4a uses frequency A, a terminal in sector 46 uses frequency B', a terminal in sector 4c uses frequency B, and a terminal in sector 4d uses frequency A'). The set of four orthogonal RF channels is then reused as shown in FIG. 1a in adjacent cells 2 (for example, in cells 2b, 2c and 2d). As shown in FIG. 1a, in each cell 2 (i.e., in cells 2a, 2b, 2c and 2d), the pattern of frequency distribution is normally a mirror image of adjacent and diagonal cells 2. Thus, the upper left-hand sector 4a of the upper left-hand cell 2a uses the same frequency (e.g., frequency A) as the upper right-hand sector 4b of the adjacent cell 2b. It also uses the same frequency as the lower right-hand sector of cell 2d, and the lower left-hand sector of cell 2c.

Because frequencies are re-used, two cells or sectors operating on the same usable frequency, though separated geographically, may interfere with each other. This is known as "co-channel interference". The effect of co-channel interference varies with terrain and distance. In cases where path loss conditions favor the desired signal, the co-channel interference may not be strong enough to have a significant impact on receiver performance. In other cases, path loss conditions may cause the difference between the desired carrier power and the interference (known as the "C/I" ratio) to be insufficient for good receiver performance. Co-channel interference is inversely proportional to a wireless communication system's capacity (i.e., ability to communicate with multiple terminal stations). Thus, as co-channel interference increases, system capacity decreases.

Well-known modulation schemes such as quadrature amplitude modulation (QAM) and quadrature phase shift keying (QPSK) are utilized in broadband wireless communications for efficiently transmitting data between terminal stations and base stations. Three typical modulation schemes for use in broadband wireless communication systems are QAM-64, QAM-16 and QPSK. When the C/I ratio is low (i.e., relatively high co-channel interference) a robust modulation scheme must be used. QPSK is a robust modulation scheme that can operate at a C/I ratio of approximately 11 dB or greater.

FIG. 1b shows a simplified graphical representation of an exemplary broadband wireless frequency re-use configuration showing the potential problems associated with co-channel interference. As shown in FIG. 1b, terminal stations located within sectors T1–T4 operate on an RF channel (A). A terminal station located within sector T1 can receive unwanted radio frequency energy from base stations 1e, 1f and 1g because these base stations 1e–g operate on the same RF channel (A) and could be in the LoS of the terminal station. Similarly, base station 1g can receive unwanted radio frequency energy from terminal stations located within sectors T1–T3. Receiving unwanted radio frequency energy causes co-channel interference.

In the exemplary broadband wireless communication system of FIG. 1b, the uplink is less spectrum efficient than is the downlink. The uplink spectrum efficiency suffers because the base station collects energy using a sector antenna having a much greater beamwidth (typically 60 to 90 degrees) while the terminal station collects energy using a highly directional antenna (typically less than 3 degrees beamwidth). Thus, the downlink can support less robust modulation schemes (e.g., QAM-64 and QAM-16) while the uplink may require the use of more robust modulation schemes (e.g., QPSK).

FIG. 2 shows a graphical representation of the uplink C/I ratio of base station 1g of FIG. 1b versus the probability of line of sight (LoS) activity of potentially interfering terminal stations (i.e., terminal stations located within sectors T1–T3). Only sectors in nearby cells are considered in this analysis because the LoS conditions and propagation characteristics change dramatically for distant cells (typically, 10–15 KM in millimeter wave frequencies). The vertical axis represents the C/I ratio measured in dB. The horizontal axis represents the probability (measured as a percentage) of a terminal station located outside of sector T4 having a LoS position relative to the base station 1g. The plot line labeled "T1+T2+T3" represents potentially interfering terminal stations from sectors T1–T3. The plot line labeled "T1 only" represents potentially interfering terminal stations from only sector T1. Co-channel interference is greatest (i.e., worst case scenario occurs) when the probability of LoS is 100 percent. Thus, the C/I ratio reaches its smallest value (i.e., co-channel interference is at its greatest) when the probability of LoS is 100%.

Referring to the T1+T2+T3 plot line of FIG. 2, when the probability of LoS of all potential interfering terminal stations located within sectors T1, T2 and T3 is greater than 50%, the C/I falls below 11 dB. Thus, the communication system's capacity is greatly reduced because not even the most robust modulation scheme (i.e., QPSK) can operate when the C/I falls below 11 dB. Referring to the "T1 only" plot line of FIG. 2, when the probability of LoS of all potential interfering terminal stations located within sector T1 is 100%, the C/I remains above 14 dB. Thus, the communication system's capacity is not as greatly affected as it is in the previous scenario because the most robust modulation scheme (i.e., QPSK) can operate when the C/I remains above 11 dB. However, at 100% LoS conditions, the more robust scheme is required. This increases the costs associated with deployment of the system and reduces the efficiencies. Therefore, eliminating co-channel interference from selected sectors (e.g., T2 and T3) will greatly increase system capacity.

Therefore, a need exists for a method and apparatus for reducing co-channel interference in a wireless communication system. The co-channel interference reducing method and apparatus should increase the wireless communication system's capacity. Such a co-channel interference reducing method and apparatus should utilize uplink and downlink bandwidth in an allocation-efficient manner. The present invention provides such a co-channel interference reducing method and apparatus.

SUMMARY OF THE INVENTION

The present invention is a novel method and apparatus for reducing co-channel interference in a wireless communication system. The present invention includes a powerful means for eliminating co-channel interference caused by terminal stations in a wireless communication system. The present co-channel interference reducing method and apparatus utilizes synchronization between selected time frames (for example, between even and odd time frames) to reduce co-channel interference. Advantageously, the present invention reduces co-channel interference and, thus, allows robust modulation schemes to operate even during a worst case scenario of 100% line-of-sight (LoS) interference. While the present invention improves system performance and capacity in both FDD and TDD systems, one embodiment of the present invention uses an adaptive TDD technique to further improve frequency re-use efficiencies. In accordance with this technique, when the uplink and downlink frequency re-use efficiencies differ, the present invention implements an uplink/downlink ratio formula to further improve system capacity (i.e., reduce co-channel interference). The present invention compensates for the re-use efficiency differences in the uplink and the downlink by changing the ratio between the uplink and downlink time portions.

The present inventive method and apparatus can be used in any type of frame based and frame synchronized communication system having time frames and base station synchronization. One such example is use of the invention in a 4 sector, 2 frequency sets TDD broadband wireless communication system. Alternatively, the present invention can be used in a 6 sector, 3 frequency sets TDD broadband wireless communication system.

In the preferred embodiment of the present invention, geographically close base stations having potentially interfering terminal stations operate on the uplink on selected frames only. Depending on bandwidth demands and spectrum efficiency, the present invention can change the uplink and downlink time frame ratio utilizing a formula based on system capabilities and demands.

BRIEF DESCRIPTION OF THE DRAWINGS

Like reference numbers and designations in the various drawings indicate like elements.

DETAILED DESCRIPTION OF THE INVENTION

Figure 1A:
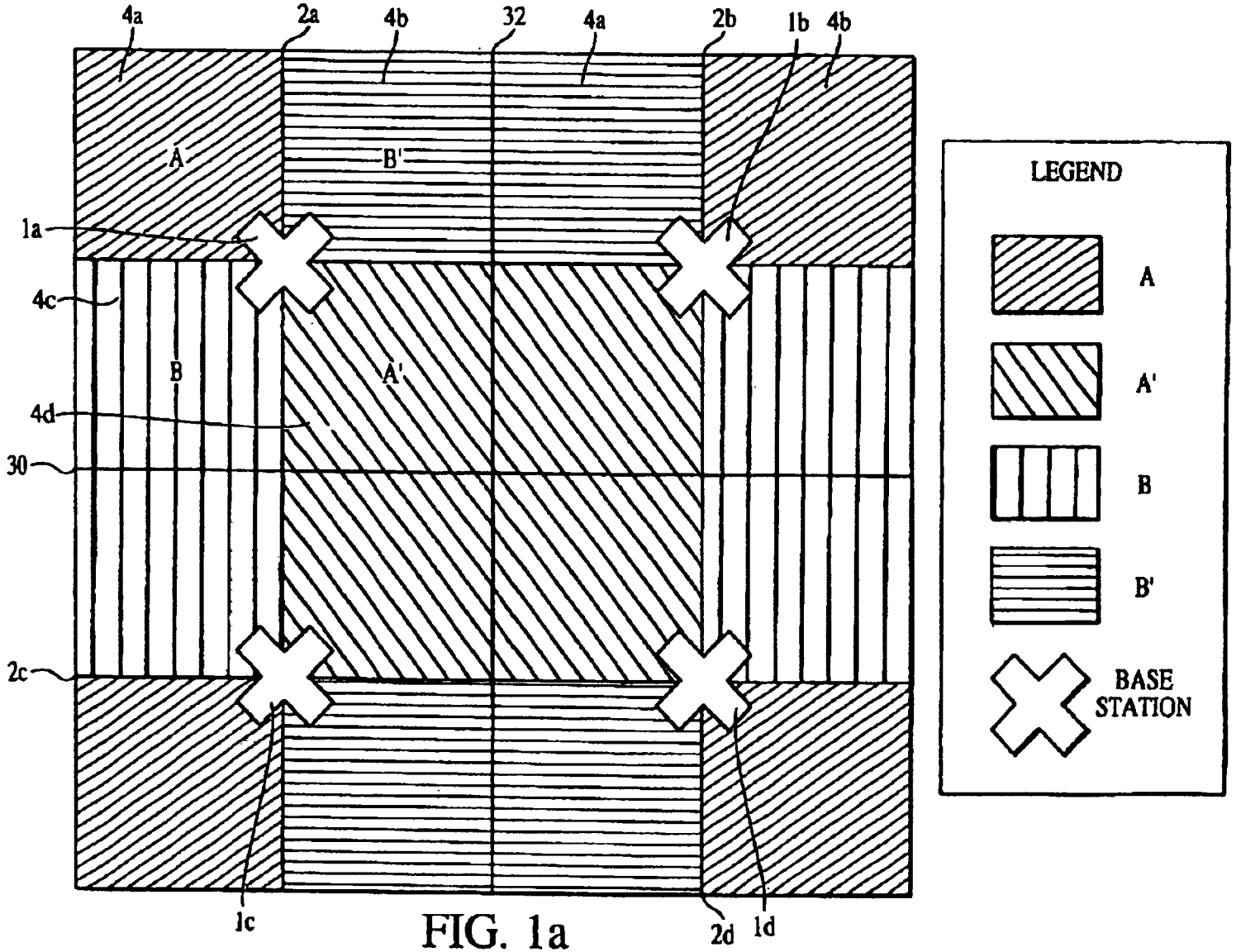
FIG. 1a is a simplified diagram of an exemplary broadband wireless configuration showing frequency re-use.

Throughout this description, the preferred embodiment and examples shown should be considered as exemplars, rather than as limitations on the present invention.

The preferred embodiment of the present invention is a method and apparatus for reducing co-channel interference in a frame-based and frame-synchronized broadband wireless communication system. The present invention eliminates co-channel interference from selected base stations by transmitting uplink data from the selected base stations at pre-selected time frames while transmitting uplink data from other base stations at different pre-selected time frames. In one preferred embodiment, in a TDD system where the uplink and downlink frequency re-use efficiencies differ, the present invention implements an uplink/downlink ratio formula to compensate for the re-use efficiency differences. An exemplary frame-synchronized wireless communication system for use with the present co-channel interference reducing method and apparatus is now described.

Overview of a Frame-Based Communication System for Use with the Present Co-Channel Interference Reducing Invention An exemplary broadband wireless communication system for use with the present invention is described in the related U.S. Pat. No. 6,016,311, by Gilbert et al., issued Jan. 18, 2000, entitled "Adaptive Time Division Duplexing Method and Apparatus for Dynamic Bandwidth Allocation within a Wireless Communication System", which is hereby incorporated by reference herein for its teachings on wireless communication systems. The communication system described in U.S. Pat. No. 6,016,311 is an adaptive time division duplexing (ATDD) method and apparatus for duplexing transmissions in wireless communication systems. The ATDD system facilitates the efficient use of communication channels in wireless communication systems by adapting to the uplink and downlink bandwidth requirements of the channels. In accordance with the ATDD system, the communication link bandwidth requirements are continuously monitored using sets of pre-determined bandwidth requirement parameters. The ATDD system flexibly and dynamically allocates time slots for either uplink or downlink transmissions in response to the changing bandwidth needs of the communication links. The ATDD system is particularly useful in wideband or broadband wireless communication systems, although it may also be used in any data communication system where an adaptive and dynamic time division duplexing transmission scheme is desirable.

In contrast to the TDD systems of the prior art which have time slots dedicated for either uplink or downlink transmissions, the ATDD system dynamically changes the time slot designation as either an uplink or downlink transmission period. Consequently, the uplink/downlink bandwidth allocation can be changed to accommodate the uplink/downlink bandwidth requirements of the link. The ATDD system thus allows channels to use either a symmetric or asymmetric uplink/downlink time slot allocation depending upon the needs of the channel. In the case of asymmetric time slot allocation, the ATDD system alternatively allows asymmetry in favor of the uplink (i.e., allocates more uplink time slots than downlink time slots) or in favor of the downlink (i.e., allocates more downlink time slots than uplink time slots).

A myriad of time slot allocation schemes is possible. One simplified time slot allocation scheme uses a "frame-based" approach which allows the system to dynamically allocate a first number of time slots of a frame for downlink (alternatively, uplink) transmissions only while configuring the remaining time slots of the frame for uplink (alternatively, downlink) transmissions. An alternative frame-based approach similarly allows the system to dynamically allocate a first number of time slots of a frame for downlink (alternatively uplink) transmissions only, however the remaining time slots of the frame may be allocated for either uplink or downlink transmissions, depending upon the channel bandwidth needs.

The ATDD system is particularly advantageous when used in a wireless communication system offering broadband data, video and telephone services. The wireless communication system preferably comprises a plurality of cells -organized into cell clusters, each cell including a base station having an associated active antenna array, and each base station providing wireless connectivity to a plurality of customer sites having a plurality of customer premises equipment.

In one preferred embodiment of the ATDD system, channel efficiency and data bandwidth improvements are achieved by using bandwidth requirement parameters to monitor and update the communication link time slot allocations. In accordance with the ATDD system, each communication session is preferably assigned both an "initial" and an "actual" set of bandwidth parameters. The initial set of bandwidth parameters can be established when the system is first installed. The actual set of bandwidth parameters are created and maintained by the system using the monitoring and updating technique of the present invention. Once the system learns about the exact nature of a communication session's bandwidth requirements it updates the initial values to accurately reflect the actual bandwidth requirements of the channel. In addition to assigning, monitoring, and updating session bandwidth parameters, the present ATDD system also maintains a set of bandwidth parameters for both the base stations and the cluster controllers of the wireless communication system. The base station parameters are used in controlling the uplink/downlink time slot allocations for a given cell. The cluster parameters are used in controlling the uplink/downlink time slot allocations for all of the cells in a given cluster.

Uplink Time-Frame Allocation Scheme

The present invention reduces co-channel interference in a frame-synchronized broadband wireless communication system. The present invention eliminates co-channel interference from selected base stations by transmitting uplink data from the selected base stations at selected time frames while transmitting uplink data from other base stations at different selected time frames.

In the preferred embodiment of the present invention a simple method allows elimination of co-channel interference from selected base stations. The method can be used with systems that have a framing structure on the downlink and uplink, or alternatively only on the uplink, as do TDD or half-duplex-FDD systems. As defined herein, a "frame synchronized" system is one in which all of the base stations use frame based communications, and wherein all of the frames are synchronized to one another in the time domain. Typically, some amount of "guard" time is required between the cells to allow for propagation delays. All of the base stations in these frame synchronized systems communicate with their respective subscriber units (or terminal stations in the broadband wireless access systems) using time frames, wherein the frames are synchronized in time. It will be obvious to those skilled in the art that frame based systems exist that are not synchronized in time on a bit clock level. However, the present invention contemplates use in frame based, and frame synchronized communication systems.

In accordance with the present invention, base stations having potentially interfering terminal stations are identified, and then, depending upon the base station's location, assigned to communicate on the uplink during separate time frames. Base stations having potentially interfering terminal stations are base stations that operate on the same frequency, have the same polarization, and have sectored antennas facing the same direction relative to absolute North.

In accordance with the present invention, base stations having potentially interfering terminal stations that are geographically located on the same or similar diagonals (relative to the base station) operate on a, first set of time frames (e.g., "even" time frames). Similarly, base stations having potentially interfering terminal stations that are not geographically located on the same or similar diagonals operate on a second set of time frames (e.g., "odd" time frames).

Figure 1B:
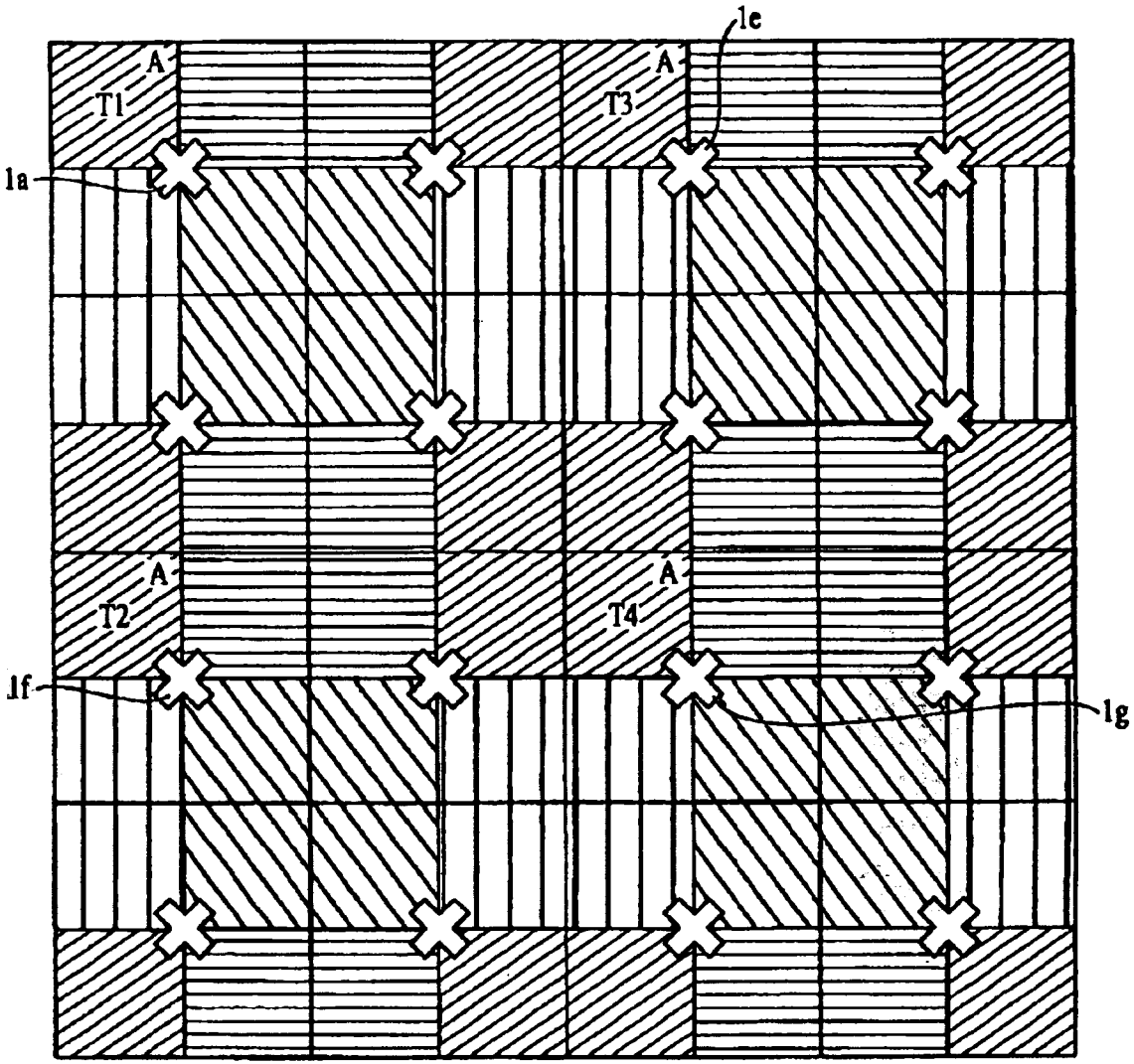
FIG. 1b shows a simplified graphical representation of an exemplary broadband wireless frequency re-use configuration showing the potential problems associated with co-channel interference.
Figure 2:
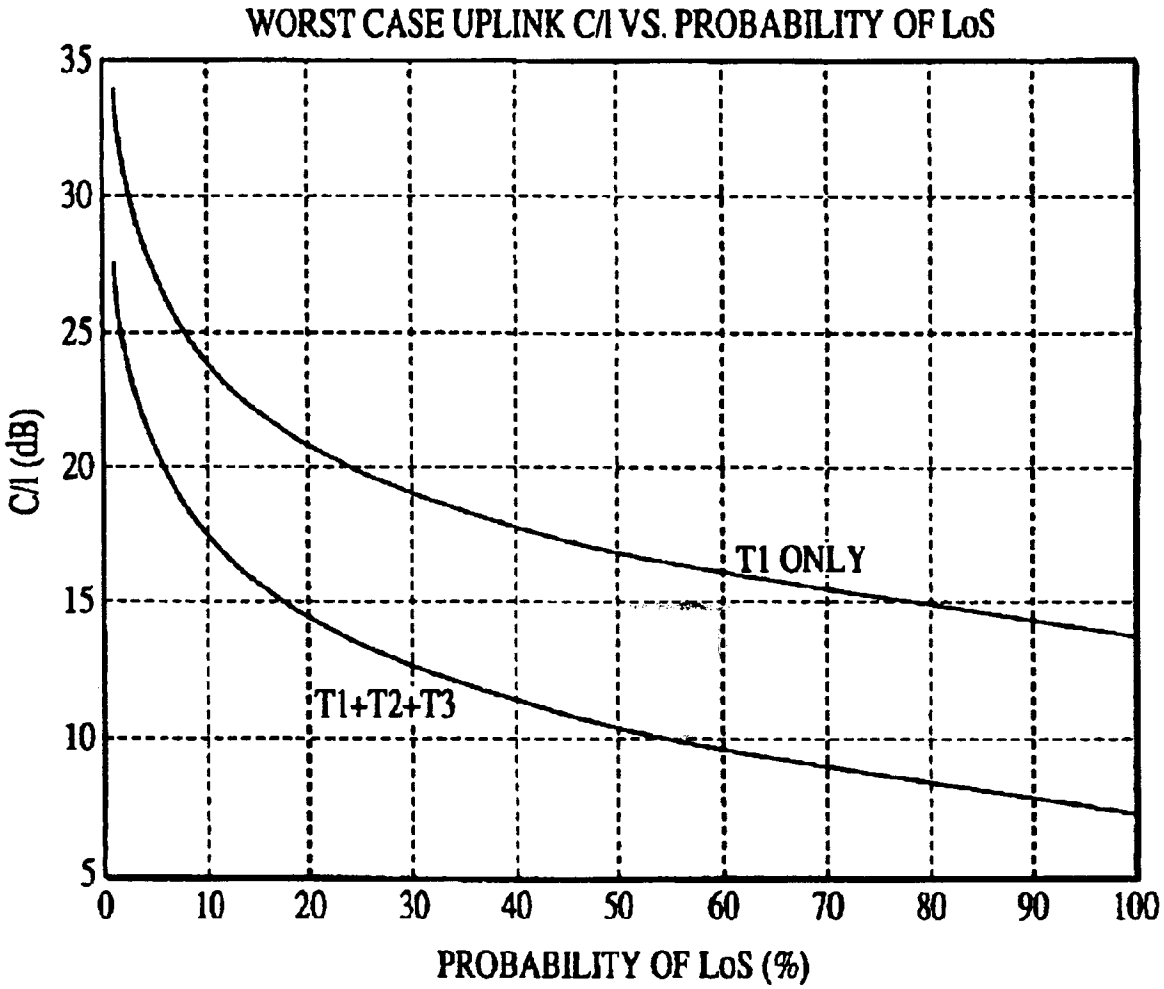
FIG. 2 shows a graphical representation of the uplink C/I ratio of base station 1g of FIG. 1b versus the probability of line of sight (LoS) activity of potentially interfering terminal stations.
Figure 3:
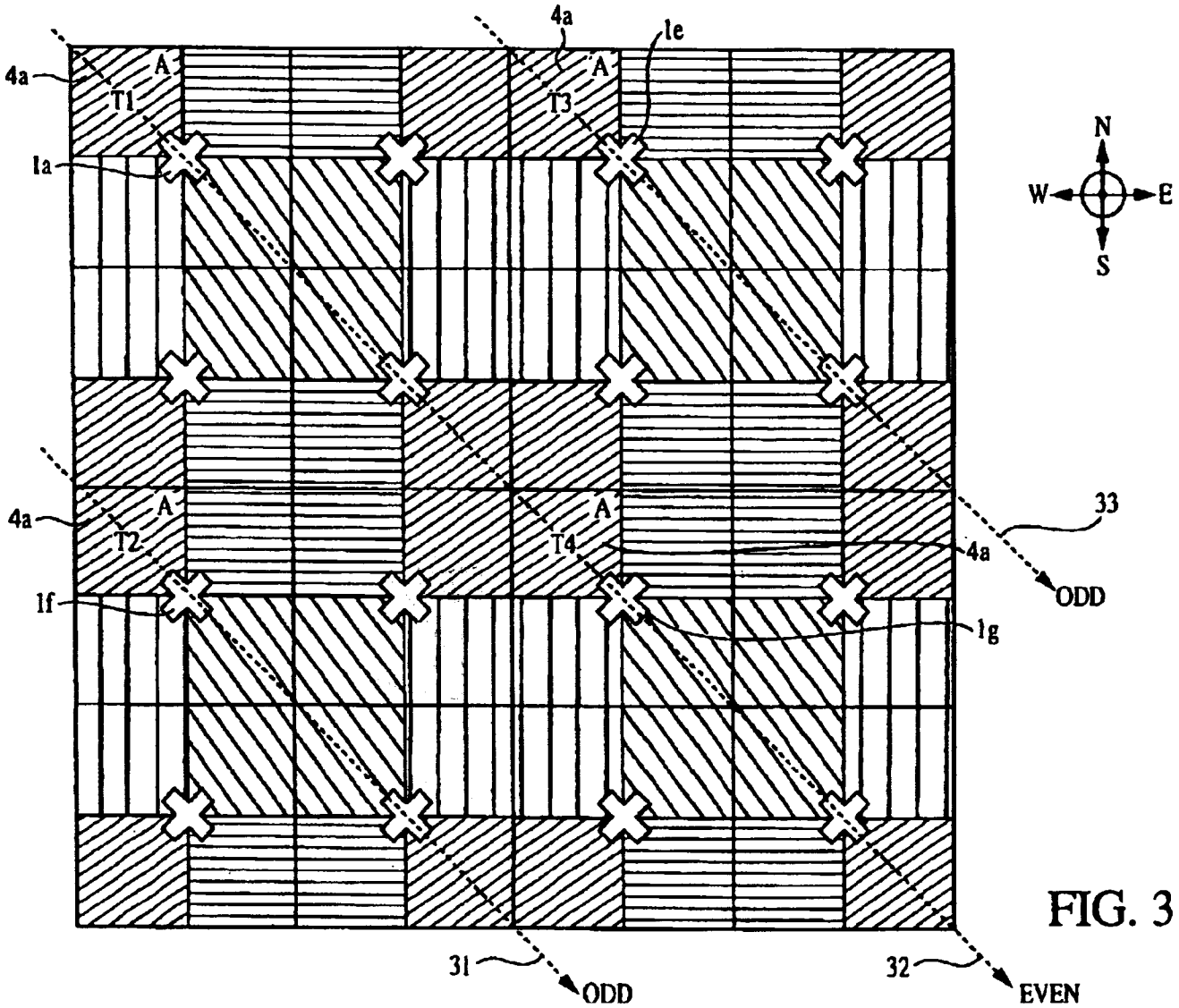
FIG. 3 shows the simplified representation of the system of FIG. 1b utilizing the uplink time-frame allocation scheme of the present invention.

FIG. 3 shows the simplified representation of the system of FIG. 1b utilizing the uplink time-frame allocation scheme of the present invention. As shown in FIG. 3, when communicating with terminals located in sectors 4a, base stations 1a, 1e, 1f and 1g operate on the same frequency (frequency A), have the same polarization and have sectored antennas facing the same direction (northwest). Thus, the sectors 4a associated with the base stations 1a, 1e and 1f have terminal stations that can potentially interfere with the base station 1g when communicating on the uplink. The base station 1a is geographically located on the same diagonal ray 32 as the base station 1g. Thus, in accordance with the present invention, base stations 1a and 1g operate on a first set of time frames in the uplink. For example, base stations 1a and 1g only operate on even time frames in the uplink. Base station 1e is located on a diagonal ray 33, and base station 1f is located on a diagonal ray 31. Base stations 1e and 1f are not geographically located on the same diagonal ray 32 relative to the base station 1g. Thus, in accordance with the present invention, base stations 1e and 1f operate on a second set of time frames in the uplink. For example, base stations 1e and 1f operate on odd time frames in the uplink. Therefore, co-channel interference relative to the base station 1g is eliminated from terminal stations in sectors T2 and T3 (the sectors 4a associated with the base stations 1f and 1e, respectively). Thus, even in a Worst case scenario (FIG. 2) of 100% LoS, the base station 1g can still operate with a QPSK modulation scheme because only terminal stations in sector T1 will interfere with the uplink of the base station 1g.

Figure 4:
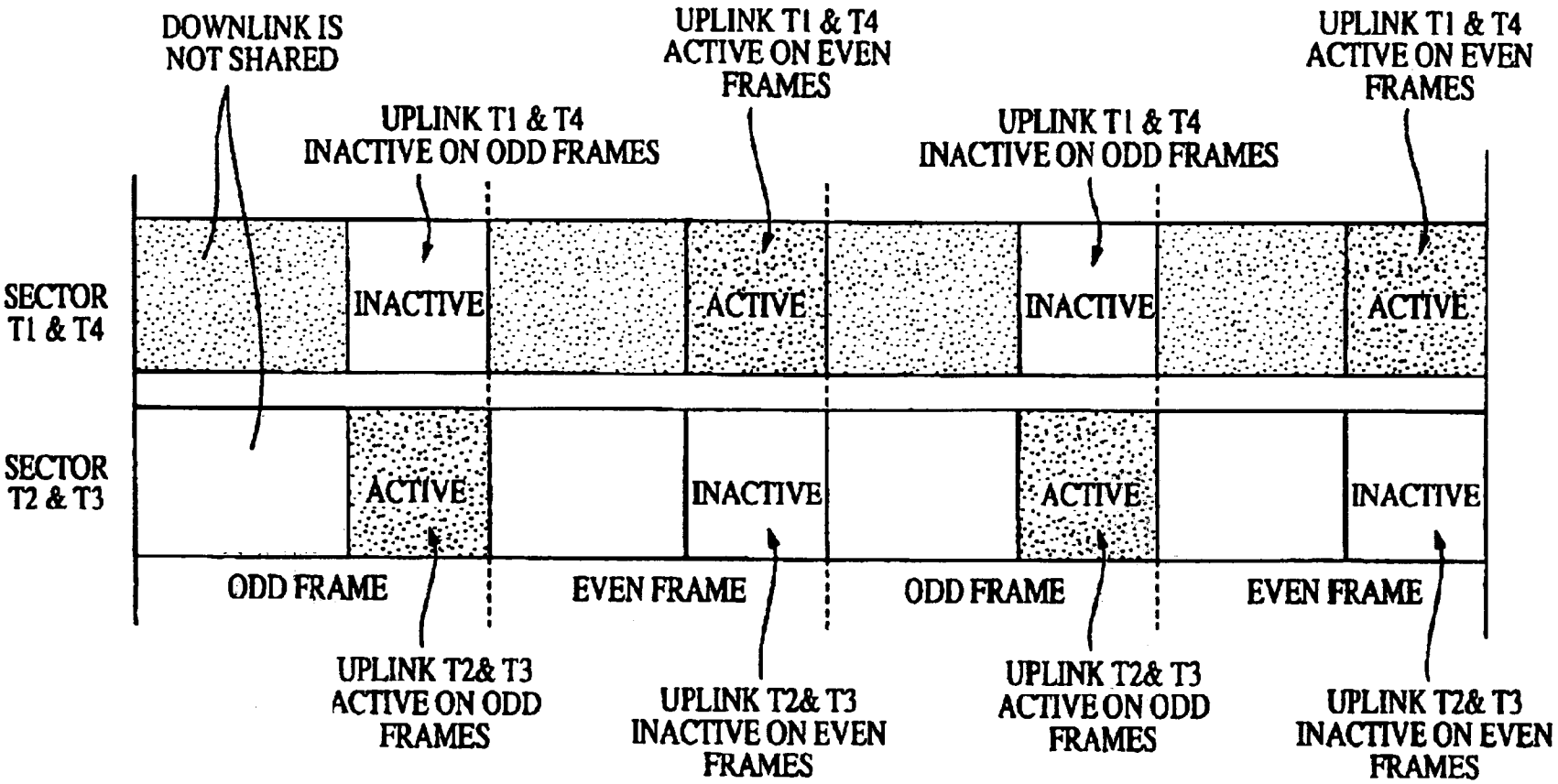
FIG. 4 shows an exemplary time frame map of the frequency re-use scheme described with reference to FIG. 3.

FIG. 4 shows an exemplary time frame map of the frequency re-use scheme described with reference to FIG. 3. As shown in FIG. 4, terminal stations located within sectors T1 and T4 (on the same diagonal relative to the base station 1g) operate on the uplink (i.e., are active) only during even time frames. Terminal stations located within sectors T2 and T3 do not operate on the uplink (i.e., are inactive) during even time frames. Therefore, the terminal stations in the sectors T2 and T3 do not contribute to C/I on the uplink during the even time frames. Referring to FIG. 3, advantageously, during even time frames, only terminal stations in sector T1, can contribute to the C/I realized by base station 1g in the uplink direction.

Similarly, the terminal stations located within sectors T2 and T3 (not on the same diagonal relative to the base station 1g) operate on the uplink (i.e., are active) only during odd time frames. Terminal stations located within sectors T1 and T4 do not operate on the uplink (i.e., are inactive) during the odd time frames. Therefore, during the odd time frames, the base station 1g only receives potential interference in the uplink from terminal stations located in the sectors T2 and T3. However, terminal stations located in sector T4 are inactive on the uplink during this period, so the interference that may be produced by the terminal stations in sectors T2 and T3 do not degrade system performance on the uplink.

Those of ordinary skill in the art shall recognize that any communication system that operates in a frame based and frame synchronized manner in the uplink, having frame-synchronized base stations, can be used to practice the present inventive uplink frequency allocation re-use scheme. For example, half-duplex FDD and TDD can be used with the present invention. Also, different time frame allocation schemes can be used with the present invention without departing from the scope or spirit of the invention. For example, terminal stations within sectors T1 & T4 can operate on the uplink every third frame. In this scheme, the terminal stations within the sectors T2 and T3 would be inactive on the uplink during the time frames that T1 and T4 were active on the uplink.

The present inventive frequency re-use scheme can also be extended and adapted for use in systems using a wide range of cell topologies. In addition, those skilled in the art shall recognize that the present invention can be adapted to reduce specific potential interference producers within a cell or sector, wherein the specific potential interference producers are more likely to interfere due to propagation conditions in the environment. Note that in this case the entire system is not penalized by a factor of 2 using the present invention (i.e., all of the users in the system are not penalized by a factor of 2 based upon the even/odd time frames used). Rather, the system allows these interfering users to communicate on a 1 to N basis. The other system users (most of the other users) communicate on a N−1 to N basis. N is greater than 1, and typically much greater than 1.

Uplink/Downlink Ratio Allocation Scheme

The present invention utilizes a variable ratio for uplink/downlink communication time frames when co-channel interference dictates different spectrum efficiencies for the uplink and the downlink. Spectrum efficiency is defined herein as the amount of information that can be transmitted in a communication system as measured in bits per Hertz (bps/Hz). Typically, spectrum efficiency is proportional to system capacity and inversely proportional to interference. Thus, as a system's interference decreases, the system's spectrum efficiency and capacity increases. As is well known, some wireless communication systems have different spectrum efficiencies for the uplink (Su) and the downlink (Sd). For example, as described above, broadband wireless access communication systems typically have different co-channel interference and thus spectrum efficiencies on the uplink as compared with the downlink due to differences between the sectored antenna used by the base stations and the narrow bandwidth antenna used by the terminal stations. As described in more detail below, the present invention can take advantage of adaptive TDD techniques (such as those described in incorporated and commonly assigned U.S. Pat. No. 6,016,311) to compensate for differences between the uplink and downlink spectrum efficiencies.

Although U.S. Pat. No. 6,016,311 teaches changing the uplink/downlink ratio based upon traffic asymmetry conditions, it does not account for changing this ratio based upon differences in spectrum efficiencies and co-channel interference in the uplink and downlink. The present invention advantageously uses a variable ratio for the uplink and downlink to compensate for the re-use efficiency differences between the uplink and the downlink.

In accordance with the present invention, when interference dictates different spectrum efficiencies in the uplink and the downlink an Adaptive TDD approach is used to compensate for the differing inefficiencies by shifting the imbalance using time compensation. For example, consider the case where it is desired to have symmetric uplink and downlink net bandwidth (i.e., 50% of the bandwidth allocation is reserved for the uplink and 50% for the downlink), but, for the reasons described above, the downlink average spectrum efficiency is approximately 3 bits per second (bps) per Hz while the uplink average spectrum efficiency is approximately 1.5 bps/Hz. In this case, the differences in spectrum efficiencies can be compensated by changing the allocated bandwidth. For example, in the scenario described, each frame can be divided into uplink and downlink portions having a ratio of 3 to 1.5, or 2 to 1, meaning that approximately 67% of the frame is allocated for uplink transmissions and approximately 33% is allocated for downlink transmissions. Due to the spectrum inefficiencies given, the desired 50/50 net uplink/downlink bandwidth ratio results.

Consider another specific example where, due to different bandwidth requirements, a downlink/uplink bandwidth allocation ratio of 80% is desired (80% of the net bandwidth allocated for the downlink and only 20% of the net bandwidth allocated for the uplink). This may be a typical scenario in the case where an Internet web user typically requires much data from the base station on the downlink, but transmits a relatively small amount of data on the uplink. Assumring the same downlink/uplink spectrum efficiencies described above (i.e., 3 bps/Hz on the downlink but only 1.5 bps/Hz on the uplink), an adaptive TDD approach can be used to change the uplink/downlink bandwidth allocation ratio to compensate for the spectrum efficiencies differences to achieve the desired net bandwidth allocation of 80/20, by allocating 67% of the frame for downlink communications, 33% of the frame for uplink communications. Or, described in another manner, an 80/20 desired net bandwidth allocation (downlink/uplink) is a 4/1 ratio. By allocating 2/3 for the downlink, and 1/3 for the uplink, or (2/3*3 (bps/Hz))/(1/3*3/2 (bps/Hz))=2/(1/2)=4/1, the desired net 4 to 1 bandwidth allocation ratio is achieved despite the differences between the uplink and the downlink efficiencies.

Now we turn to the more general case. Typically, when a specific net downlink/uplink ratio is desired in a time frame communication system, the fractional part of the time frame (or bandwidth) dedicated for the downlink (Rd) is calculated and the system adjusts the bandwidth allocation accordingly. Equation 1 is utilized to calculate Rd.

$$Rd=1/[(Sd/Su)/(Td/Tu)+1]; \quad \text{Equation (1)}$$

where, Sd=spectrum efficiency for the downlink;

Su=spectrum efficiency for the uplink;

Td=time slots allocated by the system on the downlink;

Tu=time slots allocated by the system on the uplink.

The Td/Tu ratio is monitored and adjusted in a well-known manner by the communication system. Thus, the time frame (the amount of bandwidth dedicated to the uplink and the downlink) can be adapted in the time domain accordingly. For example, an ATDD time frame method can allocate the downlink portion of a time frame according to the Rd value calculated utilizing Equation 1. The fractional part of the time frame dedicated to the uplink (Ru) is simply calculated from the Rd using the following formula: Ru=1−Rd.

In accordance with the present invention, when the uplink time frame allocation scheme described above (with reference to FIGS. 3 and 4) is utilized (e.g., odd/even time frame allocation), Equation 2 is utilized for calculating Rd:

$$Rd=1/[(Sd/Su)/(Td/Tu/2)+1] \quad \text{Equation (2)}$$

Note that the time slots allocated by the system on the uplink, or Tu, is divided by a factor of "2" in Equation 2. As described above, and for the reasons given above, in BWA systems, the uplink typically experiences greater co-channel interference than does the downlink. Consequently, there is less re-use of frequencies on the uplink than there is on the downlink. The uplink is penalized by the RF planning scheme due to the increased interference in the uplink. Equation 2 compensates in time for this difference between the uplink and downlink frequency re-use efficiency by allowing for more uplink time.

Thus, the present inventive method and apparatus can utilize a combination of a downlink/uplink ratio and an uplink time frame allocation scheme to reduce co-channel interference in a broadband wireless communication system having ATDD. The present co-channel interference reducing method and apparatus is now described in the context of various exemplary communication re-use schemes.

Exemplary Communication Re-Use schemes

The present inventive co-channel interference reducing method and apparatus has been described above in the context of a communication re-use scheme having a frequency re-use factor of 2, 2 frequency sets (A and B) and 4 sectors per cell. As one of ordinary skill in the wireless communication art shall recognize, the present invention is not so limited and different communication re-use schemes can be utilized without departing from the scope or spirit of the present invention. Examples of such alternative schemes are now described with reference to FIGS. 5–8.

Re-Use 2, 1 Frequency Set, 4 Sectors

Figure 5A:
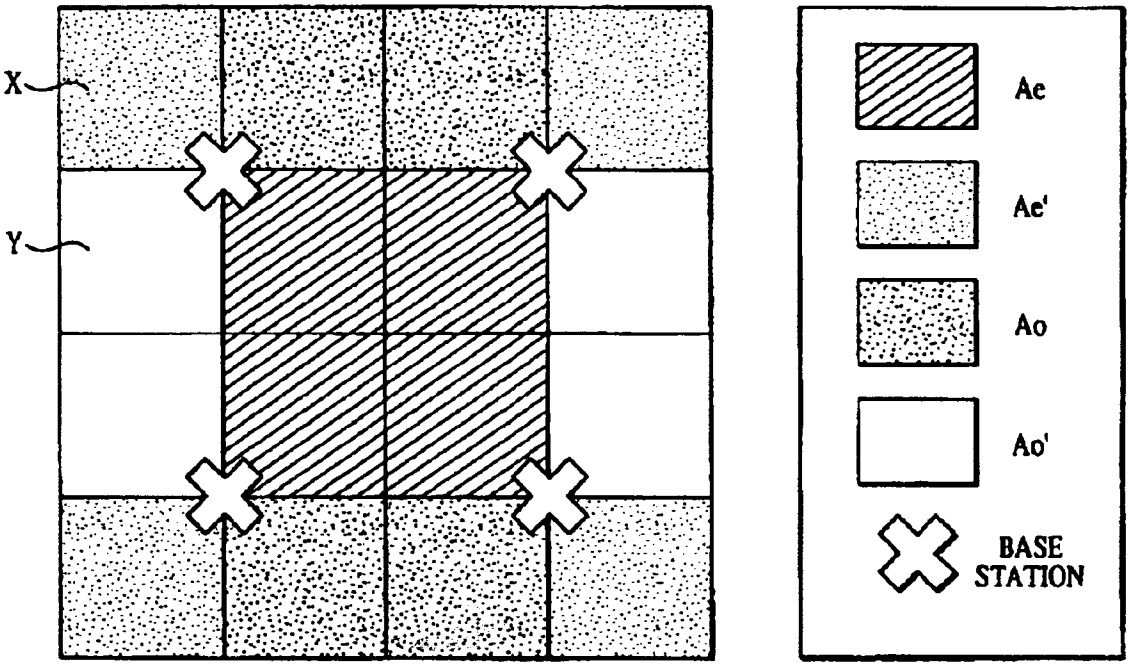
FIG. 5a shows a simplified graphical description of a frequency re-use scheme for use with the present invention having a frequency re-use factor of 2, 1 frequency set and 4 sectors per cell.
Figure 5B:
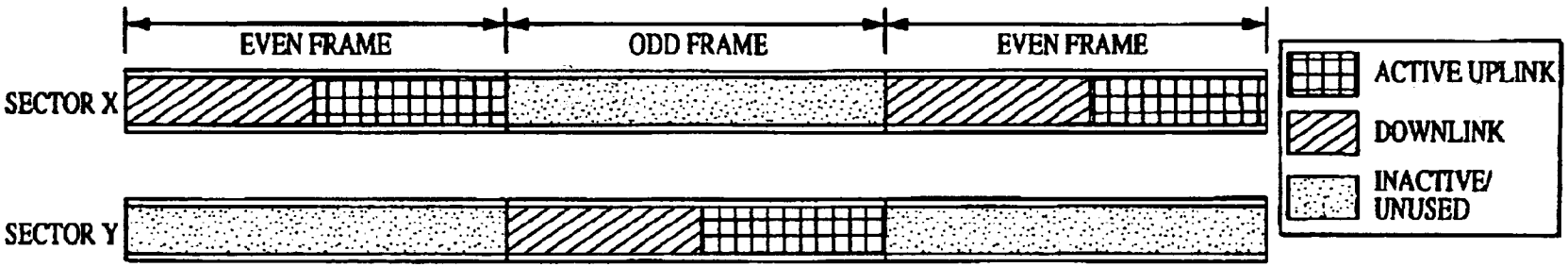
FIG. 5b shows an exemplary time frame map representing the uplink and downlink allocation of sectors X and Y.

FIG. 5a shows a simplified graphical description of a frequency re-use scheme for use with the present invention having a frequency re-use factor of 2, 1 frequency set and 4 sectors per cell. As shown in FIG. 5a, a single frequency A is divided on a time frame allocation basis (even and odd frames) and polarized to derive four separate RF channels (Ae, Ae', Ao and Ao'). Ae and Ae' are transmitted only on even time frames. Ao and Ao' are transmitted only on odd time frames. FIG. 5b shows an exemplary time frame map representing the uplink and downlink allocation of sectors X and Y. As shown in FIG. 5b, sector X is active on the uplink during the even time frames while sector Y is active on the uplink only during the odd time frames. As one of ordinary skill in the art shall recognize the communication scheme of FIG. 5 can be readily adapted for use with the above-described present inventive method and apparatus.

Re-Use 2, 3 Frequency Sets, 6 Sectors

Figure 6:
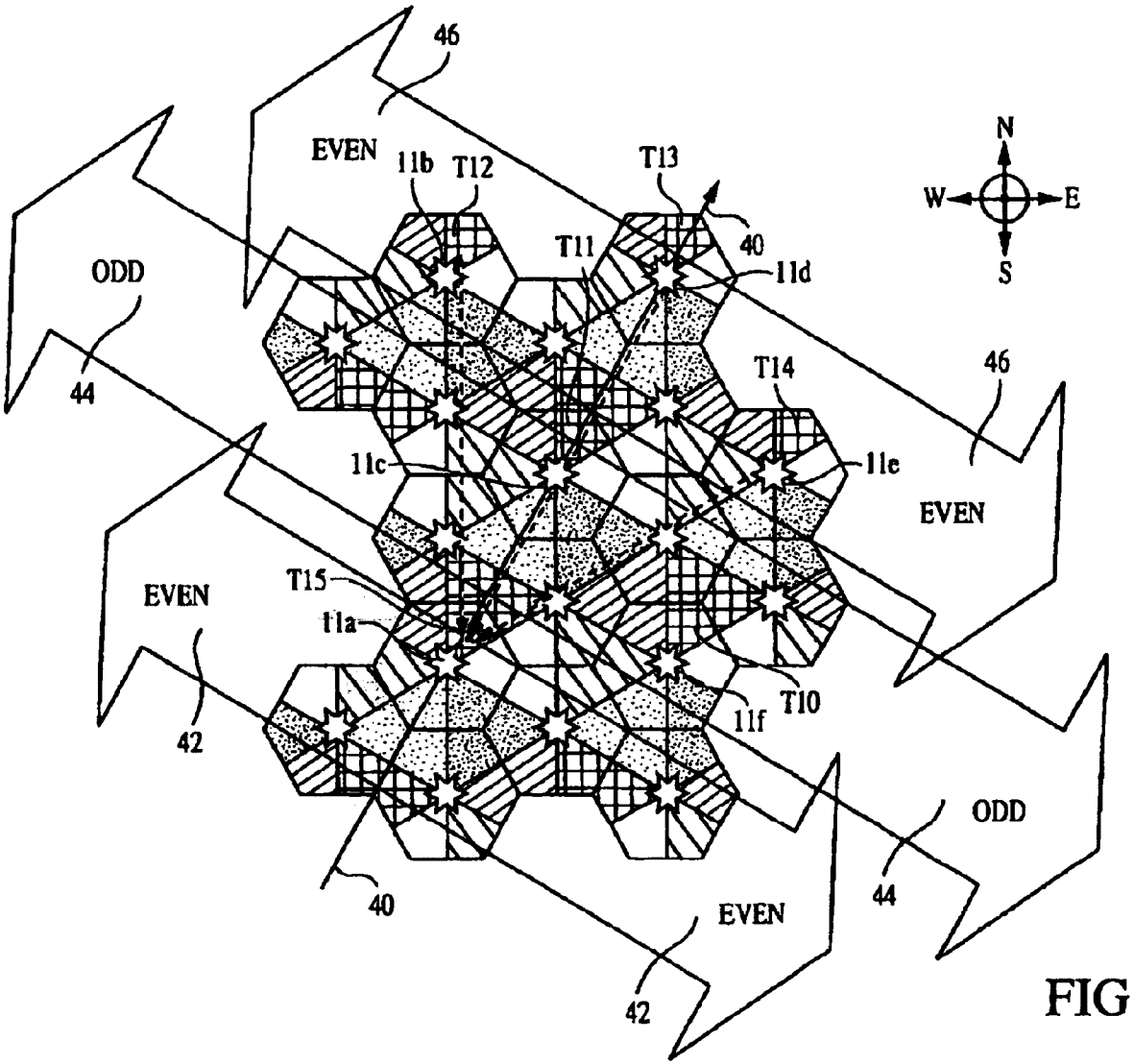
FIG. 6 shows a simplified graphical description of a frequency re-use scheme in accordance with the present invention having a frequency re-use factor of 2, 3 frequency sets and 6 sectors per cell.

FIG. 6 shows a simplified graphical description of a frequency re-use scheme in accordance with the present invention having a frequency re-use factor of 2, 3 frequency sets (3 different frequencies having 2 polarizations) and 6 sectors per cell. As shown in FIG. 6, 3 frequency sets are polarized to derive 6 distinct RF channels (denoted in the figure by various different shadings). Sectors having the same shading use the identical frequency and the identical polarization (i.e., sectors having the same shading use identical RF channels). Cells are nominally hexagonally shaped having 6 RF channels per cell.

As shown in FIG. 6, base stations 11a, 11b, 11c, 11d, 11e and 11f all use identical frequency re-use patterns. Identical re-use patterns are defined herein as cells that use identical RF channels for each similarly geographically located sector within the cell. For clarity sake, as shown in FIG. 6, the cell associated with base station 11a uses the same frequency re-use pattern as base station 11b. Each sector associated with base station 11a and 11b, and facing the same direction with respect to their respective base stations 11a and 11b, use the same RF channel. For example, sector T15 (extending from base station 11a in a northeast direction) uses the same RF channel as does sector T12 (which extends from its associated base station 11b in the same direction, northeast). As shown in FIG. 6, every other sector in the cells served by base station 1a use the same RF channels as do their geographical counterpart sectors served by base station 11b.

In order to reduce co-channel interference in the uplink, we must identify all terminal stations that may potentially cause co-channel interference in the uplink. In order to do this, only those base stations that use identical frequency re-use patterns and that are sufficiently near the base station of interest as to contribute to co-channel interference are considered. The novel co-channel interference reducing method and apparatus works on a sector-by-sector basis. That is, only sectors that are sufficiently proximate to a sector of interest, using the same RF channel as the sector of interest, and facing the same direction with respect to their associated base stations as does the sector of interest, need be considered for interference reduction purposes. The method is then extended and repeated for every sector in a cell and along the line of sight of each sector of the cell.

For this-example, consider the potential uplink interferers to base station 11a, and specifically, potential interference that may adversely affect terminal stations located in sector T15. As shown in FIG. 6, base stations 11b, 11c, 11d, 11e use the same frequency re-use pattern as the base station of interest, 11a. Each of these base stations uses the same frequency polarizations for sectored antennas that face the same direction (e.g., northeast). Thus, for example, base stations 11b–11e have terminal stations located in sectors T11–T14 that can potentially interfere on the uplink with the terminal stations in sector T15 that communicate on the uplink to base station 11a. Note that sectors that use the same RF channel as sector T15, but located a significant distance away from T15 are not considered as potential interferers.

Therefore, the inventive method determines all of the potentially interfering sectors that are located in cells having the identical reuse pattern as the base station of interest. In the example shown, we are interested in all sectors that may potentially interfere on the uplink with sector T15. Sector T15 faces in a northeast direction, along directional ray 40, as shown in FIG. 6. All similarly geographically located sectors (i.e., located in the line of sight of T15 and base station 11a, and face the same direction with respect to their associated base stations as does T15 faces with respect to base station 11a), that are within sufficiently close proximity to sector T15 to potentially cause co-channel interference on the uplink, and that have identical re-use frequencies and polarizations as T15, are considered using the present method. As shown in FIG. 6, sectors T11, T12, T13 and T14 all meet these criteria. The transmission stations located in these sectors are therefore potential interferers on the uplink with the transmission stations located in sector T15. The sectors are identified as potentially interfering because: (a) they use the same RF channel as does sector T15, (b) they face the same direction with respect to their associated base stations as does T15 (in this case, the direction of directional ray 40, e.g., northeast), and they are sufficiently proximate sector T15 as to potentially contribute to co-channel interference on the uplink of base station 11a.

The novel method next logically groups the identified potentially interfering sectors into separate timing groupings depending upon their proximity from the sector of interest, in this case, sector T15. For example, the first such sector is the closest sector, T11, associated with base station 11c. An equidistant sector (equidistant from sector T15) that also uses the identical RF channel as T15, is T10, associated with base station 11f. However, T10 is not in the line of sight of sector T15 along directional ray 40, and therefore would not significantly interfere. Nonetheless, for purposes of the present invention, T10 can be logically grouped in the same timing grouping as T11. All other sectors having the same RF channel and along the same diagonal directional ray as indicated by diagonal directional ray 44 are logically grouped together in this first timing grouping.

Owing to the configurations of the sectors with respect to their associated base stations, the diagonal directional rays that define the sector timing groupings are perpendicular to the line of sight of the sector of interest. For example, as shown in FIG. 6, the diagonal directional ray 44 that defines the first sector timing grouping is perpendicular to the line of sight of sector T15, or the direction that sector T15 is facing with respect to its associated base station 11a. This direction is defined in FIG. 6 by the directional ray 40.

Base stations 11b, 11d and 11e use identical frequency re-use plans as base station 11a and can be defined by a second diagonal directional ray, as indicated by the second diagonal directional ray 46. Similar to the first diagonal ray 44, the diagonal ray 46 defines a second sector timing grouping comprising base stations 11b, 11d, and 11e, and sectors T12, T13 and T14, respectively. Note that the diagonal 46 is perpendicular to the ray 40, and necessarily parallel to the diagonal 44. These two diagonals, 44 and 46, are used by the present invention to control the frame timing of their respective sectors.

In order to remove the uplink interference that may be caused by the sector T11 (the closest sector to sector T15), terminal stations in the sector T11 are allowed to transmit on the uplink only during frames when those in sector T15 (of base station 11a) are inactive. Alternatively, the terminal stations in sector T11 are inactive when T15 is active on the uplink. As shown in FIG. 6 and as described above, sector T11 belongs to the first timing grouping defined by diagonal 44. Accordingly, T11 is active only during a first set of frames and inactive during a second set of frames. Assuming a frame based communication system having "odd" and "even" frames, the first set of frames may be referred to as odd frames, and the second set of frames may be referred to as even frames. Therefore, T11 is active in the uplink only during odd frames, and inactive during even frames. T15 is inactive in the uplink during odd frames, and active during even frames. FIG. 6 reflects this timing by referring to diagonal 44 as an "odd" diagonal, and diagonal 42 as an "even" diagonal. Diagonal 46 is also referred to as an "even" diagonal, because it uses the same frame timing as does sector T15. More specifically, sectors T12, T13 and T14 (defined by the even diagonal 46) are all active during even frames, and inactive during odd frames.

Advantageously, interference on the uplink from terminal stations in the geographically closest potentially interfering sector T11 (potentially interfering on the uplink with terminal stations in sector T15) is effectively removed during the time frames that the terminal stations in sector T15 are active. The co-channel interference from the other potentially interfering sectors (i e., T12–T14) is still present, but it is at acceptable levels due to the distance that these sectors are from the sector of interest T15. Therefore, the overall performance of the communication system is improved using the present invention.

Note that the reuse technique described above can be extended to include every sector in the cell of interest. Using the same approach as described above, a second sector of interest is selected. For example, the sector directly adjacent to T15 and to the west of T15 is selected as the second sector of interest. This sector now faces a second direction with respect to base station 11a. In this case diagonal ray 40 faces a new direction, i.e., the northwest direction. Consequently, the sector timing group diagonals 42, 44 and 46 are all rotated in a counterclockwise fashion to point in a southwest to northeast direction. That is, the diagonals 42, 44 and 46 are perpendicular to the now northwest pointing directional ray 40.

The frame timing of the sectors having the same RF channel as the new sector of interest, and defined by the diagonals 42, 44 and 46 for the sectors is the same as described above for the case when T15 was the sector of interest. Consequently, the timing of the potentially interfering sectors are defined by the even diagonals 42, 46 and the odd diagonal 44 in the same manner as described above. Those of ordinary skill in the art shall recognize that this same process can be repeated for every sector for a base station of interest in order to define the frame timing for every sector in the communication system.

Re-Use 3/2, 4 Frequency Sets, 6 Sectors

Figure 7:
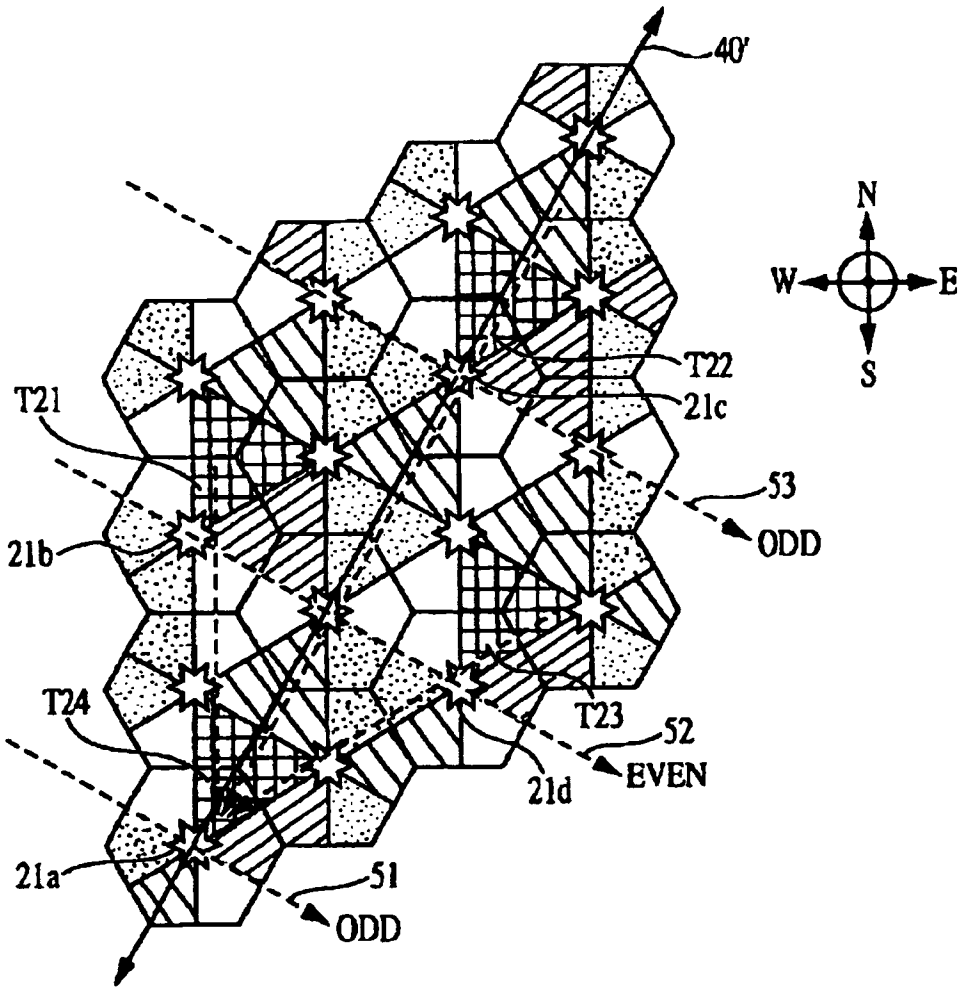
FIG. 7 shows a simplified graphical depiction of a frequency re-use scheme in accordance with the present invention, showing a frequency re-use factor of 3/2, with 4 available frequency sets and 6 sectors per cell.

FIG. 7 shows a simplified graphical depiction of a frequency re-use scheme in accordance with the present invention, showing a frequency re-use factor of 3/2, with 4 available frequency sets and 6 sectors per cell. In accordance with this re-use scheme, and as shown in FIG. 7, 3 of the 4 available frequency sets are polarized to derive 6 separate RF channels (denoted by various shadings) per cell. Sectors with identical shadings use identical RF channels. Cells are nominally hexagonally shaped. This is a simplification of a real-world environment, but it is used to describe this embodiment of the invention.

As shown by the shadings of the sectors in FIG. 7, cells corresponding to base stations 21a, 21b, 21c and 21d all have identical frequency re-use plans. The frequency re-use pattern is identical for every sector that extends in the same direction away from their respective base stations. For example, for the sectors extending in a Northeast direction away from the base stations 21a, 21b, 21c and 21d, the same frequencies, having the same polarization are used. Thus, as described above, the base stations 21b, 21c, and 21d may include terminal stations located in sectors T21, T22, and T23, respectively, that can potentially interfere on the uplink with terminal stations in sector T24 communicating with the base station 21a. Similar to the diagonal rays described above with reference to FIG. 6, the base station 21a is geographically located on the same diagonal directional ray (indicated by directional ray 40') as is the base station 21c. That is, the closest cell to the cell centered by base station 21a (closest in proximity when moving in the direction along directional ray 40'), and that also uses the identical frequency re-use pattern as does base station 21a, is the cell centered by base station 21c. Said in another way, the closest potentially interfering (on the uplink) sector to sector T24, along directional ray 40' is the sector T22.

However, as shown in FIG. 7, there are two other potentially interfering sectors, sectors T21 and T23. These sectors face the same direction (with respect to their associated and respective base stations 21b and 21d) as sector T24 faces with respect to its associated base station 21a (i.e., Northeast in the direction of ray 40'). Furthermore, sectors T21 and T23 are closer in proximity to sector T24 than is sector T22. Therefore, in order to reduce co-channel interference in the uplink from nearby potentially interfering sectors (in this case, T21 and T23), T21 and T23 are active on the uplink during a first set of time frames, T24 is active on the uplink during a second set of time frames, and vice versa.

Similar to the technique described with reference to FIG. 6, sectors T21 and T23 are therefore assigned to a first sector timing grouping designated by a first diagonal ray 52 labeled as "even" in FIG. 7. Sector T24 is assigned to a second timing grouping designated by a second diagonal ray 51 labeled as "odd" in FIG. 7. Sector T22 is also assigned to an "odd" diagonal ray 53, and uses the same timing as used by sector T24 (i.e., it is active on the uplink during the second set of time frames). If the system uses an "odd/even" time frame designation, sectors T24 and T22 are active on the uplink only during odd time frames, and inactive during even time frames. In contrast, sectors T21 and T23 are active on the uplink only during even time frames and inactive during odd time frames.

This same technique can be described with reference to the base stations associated with sectors T21–T24. Base stations 21a and 21c are active in the uplink only during odd time frames. Base stations 21b and 21d are inactive on the uplink during the odd time frames, and active only during the even time frames. Therefore, any potential co-channel interference that may have been introduced by the terminal stations in sectors T21 and T23 (relative to base station 21a, and thus affecting uplink communications from terminal stations in sector T24) is eliminated. The only potential interference on the uplink is from terminal stations in sector T22 during the odd time frames. However, this interference is acceptable because sector T22 is at a significant distance from sector T24. Consequently, co-channel interference on the uplink is reduced, capacity is increased, and less robust modulation schemes may be used. This results in a more efficient, less costly communication system.

Note that the reuse technique described above can be extended to include every sector in the cell of interest. Those skilled in the art shall recognize that the communication system of FIG. 7 can be extended as similarly described with respect to FIG. 6. Accordingly, a different sector of interest is selected, and the sector diagonals described above are rotated in a counter-clockwise fashion to point in the same direction as the terminal stations located within the sector of interest face with respect to their associated base station. Those of ordinary skill in the art shall recognize that this same process can be repeated for every sector for a base station of interest in order to define the frame timing for every sector in the communication system.

Figure 8:
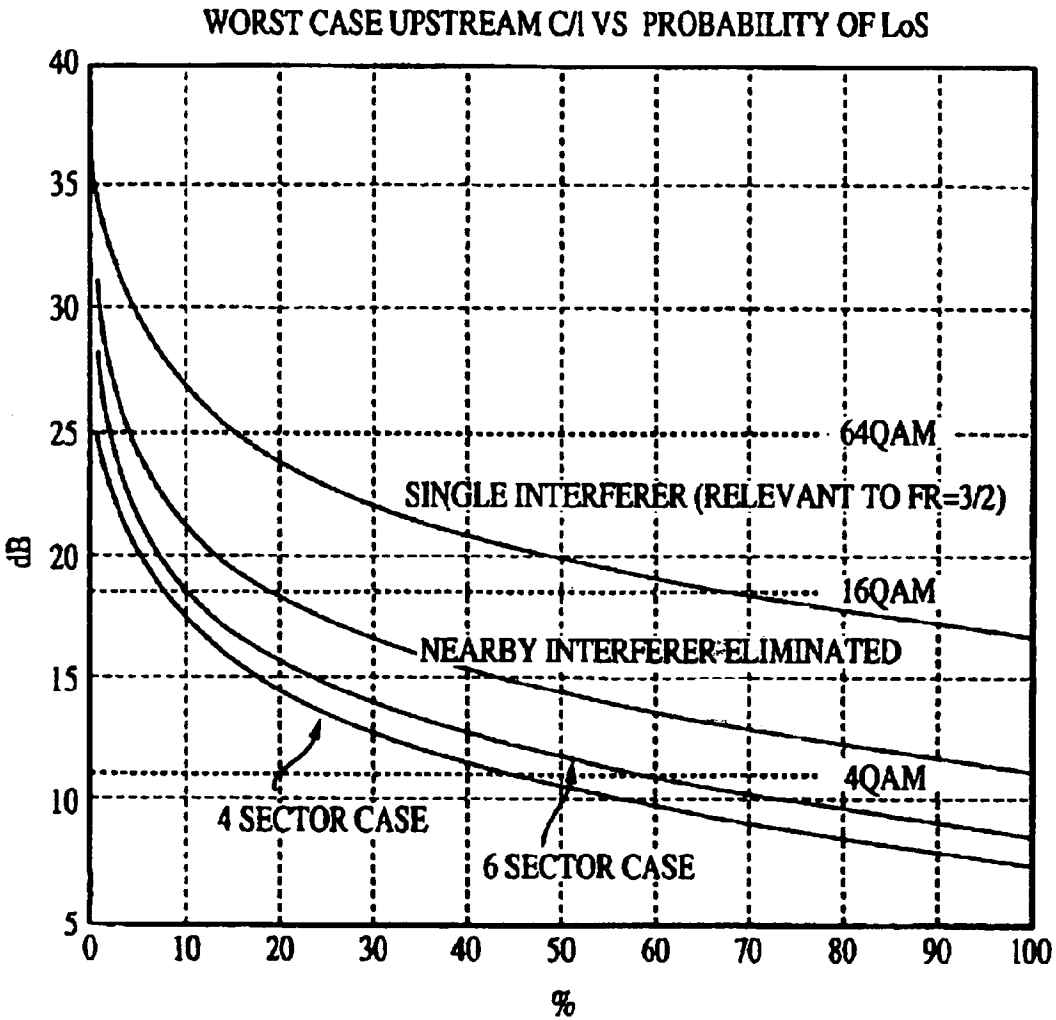
FIG. 8 shows a graphical representation of the uplink C/I ratio resulting from the use of various re-use schemes versus the probability of line of sight (LoS) activity of potentially interfering terminal stations.

FIG. 8 shows a graphical representation of the uplink C/I ratio resulting from the use of various re-use schemes versus the probability of line of sight (LoS) activity of potentially interfering terminal stations. The vertical axis represents the C/I ratio measured in dB. The horizontal axis represents the probability (measured as a percentage) of a terminal station having a LoS position relative to the desired base station. Co-channel interference is greatest (i.e., worst case scenario occurs) when the probability of LoS is 100 percent. Thus, the C/I ratio reaches its smallest value (i.e., co-channel interference is at its greatest).

Referring now to FIG. 8, four plot curves are shown that represent the observed C/I when the four re-use schemes described above are used. First, the curve labeled "4 sector case" shows the C/I associated with the 4 sector re-use scheme described above with reference to FIG. 1, wherein the co-channel interference reduction of the present invention is not employed. Second, the curve labeled "6 sector case" shows the C/I improvements observed when using the 6 sector re-use scheme described above with reference to FIGS. 6 and 7, however, without implementing the co-channel interference reduction method and apparatus of the present invention. The C/I improvement using the 6 sector re-use scheme of FIG. 6, and implementing the co-channel interference reduction scheme of the present invention, is shown in the curve labeled "Nearby interferer eliminated". Finally, the curve entitled "single interferer (relevant to FR=3/2)" plot line represents the 6 sector re-use scheme described above with reference to FIG. 7 and implementing the co-channel interference reduction of the present invention.

The horizontal dashed lines labeled "64 QAM, 16 QAM and 4 QAM" of FIG. 8 represent the minimum C/I levels below which the associated modulation schemes cannot function properly. Thus, a QAM-64 modulation scheme can operate properly at a C/I level of 25 dB or greater, but will not function properly below 25 dB. A QAM-16 modulation scheme can function properly at a C/I level of 18 dB or greater. A QAM-4 modulation scheme can function properly at a C/I level of 11 dB or greater. Analyzing the curves of FIG. 8, the "4 sector case" plot line falls below the 4 QAM line at a LoS greater than approximately 50%. Similarly, the "6 sector case" plot line falls below the 4 QAM line at a LoS greater than approximately 55%. Thus, the system capacity of the 4 sector and the 6 sector re-use schemes are greatly reduced because not even the most robust modulation scheme (i.e., 4 QAM) can function properly when the C/I falls below 11 dB.

However, when the present co-channel interference reducing method and apparatus of the present invention is utilized with the 6 sector re-use scheme described above with reference to FIG. 6 (represented by the "nearby interferer eliminated" curve), the worst case C/I scenario (i.e., 100% LoS) is 11 dB. Thus, the communication system's capacity is not greatly affected because the most robust modulation scheme (i.e., QPSK) can function when the C/I remains 11 dB or above.

Furthermore, when the present co-channel interference reducing method and apparatus is utilized with the 6 sector re-use scheme described above with reference to FIG. 7 (represented by the "single interferer" curve), the C/I falls below 18 dB at approximately 75% LoS. Thus, using the present inventive method and apparatus, a wireless communication system can operate using a QAM-16 modulation scheme whenever the LoS is less than 75%.

Exemplary Time-Frame Maps—Half-Duplex FDD and TDD

The present inventive co-channel interference reducing method and apparatus has been described above in the context of various communication re-use schemes having various frequency re-use factors, frequency sets and cell sectors (e.g., communication schemes described with reference to FIGS. 3, 6 and 7). Those of ordinary skill in the art shall recognize that any communication system that operates in a frame based and frame synchronized manner in the uplink, having frame-synchronized base stations, can be used to practice the present inventive uplink frequency allocation re-use scheme. Two exemplary time-frame maps (half-duplex FDD and TDD) that can be used in the frame-synchronized systems of FIGS. 3, 6 and 7 are now described with reference to FIGS. 9a–9b.

Half-Duplex FDD

Figure 9A:
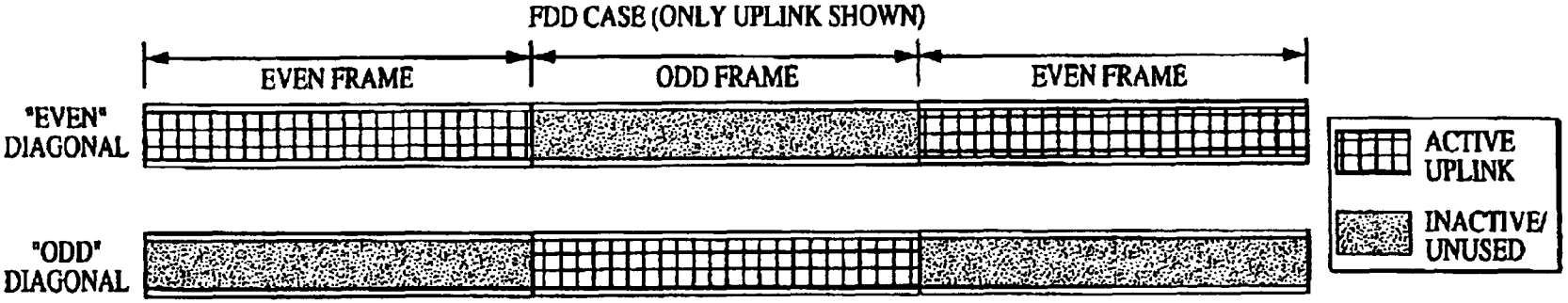
FIG. 9a shows an exemplary time frame map used in the frame-synchronized systems of FIGS. 3, 6 and 7, showing the time frame map in the uplink of an FDD system.

FIG. 9a shows an exemplary time frame map used in the frame-synchronized systems of FIGS. 3, 6 and 7, showing the time frame map in the uplink of an FDD system. The exemplary time frame map shown in FIG. 9a can be used in the frame-synchronized systems of FIGS. 3, 6 and 7. As shown in FIG. 9a, base stations located on "even" diagonals (e.g., diagonal ray 32 of FIG. 3, diagonal rays 42 and 46 of FIG. 6 and diagonal ray 52 of FIG. 7) communicate with associated terminal stations on the uplink (i.e., are active) only during even time frames. Base stations located on "odd" diagonals (e.g., diagonal rays 31 and 33 of FIG. 3, diagonal ray 44 of FIG. 6 and diagonal rays 51 and 53 of FIG. 7) communicate with associated terminal stations on the uplink (i.e., are active) only during odd time frames. Therefore, the terminal stations associated with the base stations located on the odd diagonals do not contribute to C/I on the uplink during the even time frames. Similarly, the terminal stations associated with the base stations located on the even diagonals do not contribute to C/I on the uplink during the odd time frames. Therefore, when the time frame map of FIG. 9a in the uplink of an FDD system is utilized interference that may be produced by the terminal stations in nearby sectors does not degrade system performance on the uplink.

TDD

Figure 9B:
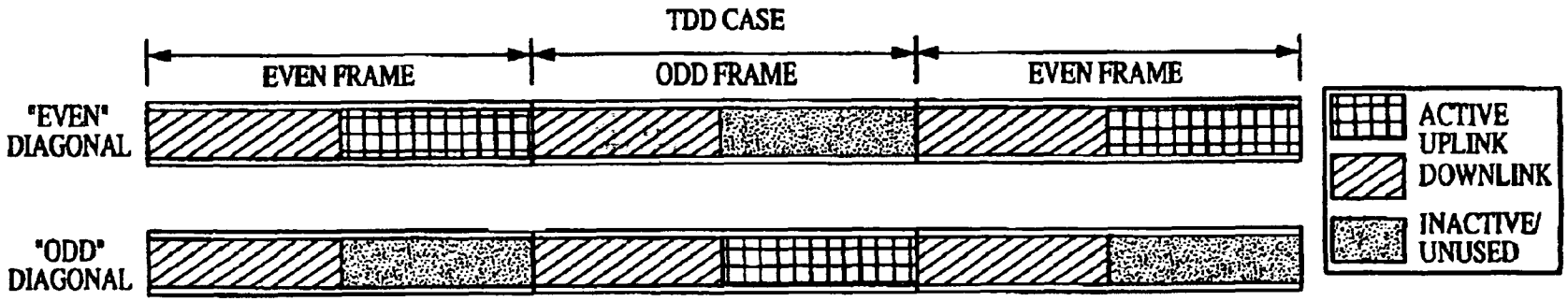
FIG. 9b shows an-exemplary time frame map used in the frame-synchronized systems of FIGS. 3, 6 and 7, showing the time frame map in the uplink and downlink of a TDD system.

FIG. 9b shows an exemplary time frame map used in the frame-synchronized systems of FIGS. 3, 6 and 7, showing the time frame map in the uplink and downlink of a TDD system. The exemplary time frame map shown in FIG. 9b can be used in the frame synchronized systems of FIGS. 3, 6 and 7. As shown in FIG. 9b, base stations located on "even" diagonals (e.g., diagonal ray 32 of FIG. 3, diagonal rays 42 and 46 of FIG. 6 and diagonal ray 52 of FIG. 7) communicate with associated terminal stations on the uplink (i.e., are active) only during even time frames. Base stations located on "odd" diagonals (e.g., diagonal rays 31 and 33 of FIG. 3, diagonal ray 44 of FIG. 6 and diagonal rays 51 and 53 of FIG. 7) communicate with associated terminal stations on the uplink (i.e., are active) only during odd time frames. Therefore, the terminal stations associated with the base stations located on the odd diagonals do not contribute to C/I on the uplink during the even time frames. Similarly, the terminal stations associated with the base stations located on the even diagonals do not contribute to C/I on the uplink during the odd time frames. Therefore, when the time frame map of FIG. 9b in the uplink of a TDD system is utilized interference that may be produced by the terminal stations in nearby sectors does not degrade system performance on the uplink. Advantageously, in utilizing the time frame map of FIG. 9b, the downlink of the TDD system is unaffected. As described above, due to system capabilities, the downlink is more robust (i.e., receives less interference) than the uplink and, thus, has a higher capacity.

SUMMARY

In summary, the co-channel interference reducing method and apparatus of the present invention includes a powerful means for eliminating co-channel interference from terminal stations in a wireless communication system. The present co-channel interference reducing method and apparatus utilizes frame synchronization between selected time frames (e.g., odd and even time frames) to reduce co-channel interference. Advantageously, the present invention reduces co-channel interference and, thus, allows robust modulation schemes to operate even at a worst case scenario of 100% line-of-sight (LoS) interference. The present invention can also implement an uplink/downlink ratio formula to further improve system capacity (i.e., reduce co-channel interference) in ATDD systems.

A number of embodiments of the present invention have been described. Nevertheless, it will be understood that various modifications may be made without departing from the spirit and scope of the invention. For example, the present inventive method and apparatus can be used in any type of frame based and frame synchronized communication system. One such example is use of the invention in a 4 sector, 2 frequency set TDD broadband wireless communication system. Alternatively, the present invention can be used in a 6 sector, 3 frequency set TDD broadband wireless communication system. In addition, adaptive antennas can be used in combination with the present invention to increase system capacity. Furthermore, multi-point to point links can be used to practice the present invention. This is equivalent to using a plurality of narrow beam sectored antennas at the base station. Accordingly, it is to be understood that the invention is not to be limited by the specific illustrated embodiment, but only by the scope of the appended claims.

What is claimed is:

1. A method of reducing co-channel interference in a frame-based broadband wireless communication system, wherein the communication system comprises a plurality of base stations and a plurality of terminal stations, wherein each terminal station is associated with at least one base station, and wherein each base station has an associated and corresponding cell, wherein each cell includes a plurality of associated and corresponding sectors, and wherein the plurality of base stations use frame-synchronized communication, and wherein the communication system comprises an uplink and a downlink, and wherein the uplink comprises an uplink signal divided into a plurality of time frames, and wherein each time frame has an associated and corresponding frame number, the method comprising the steps of:

a) determining a set of terminal stations that may potentially interfere with a selected base station;

b) determining a geographically diagonal subset of the set of terminal stations, wherein the diagonal subset communicates with a first set of associated and corresponding base stations that are approximately diagonal to the selected base station;

c) determining a geographically non-diagonal subset of the set of terminal stations, wherein the non-diagonal subset communicates with a second set of associated and corresponding base stations that are not approximately diagonal to the selected base station;

d) allocating a first set of time frames for the first set of base stations;

e) allocating a second set of time frames for the second set of base stations;

f) transmitting uplink information from terminal stations associated with the first set of base stations during the first set of time frames; and g) transmitting up link information from terminal stations associated with the second set of base stations during the second set of time frames.

2. The method of reducing co-channel interference in a frame-based broadband wireless communication system of claim 1, wherein the communication system is a half-duplex frequency-division duplexed (FDD) system.

3. The method of reducing co-channel interference in a frame-based broadband wireless communication system of claim 1, wherein the communication system is a time-division duplexed (TDD) system.

4. The method of reducing co-channel interference in a frame-based broadband wireless communication system of claim 1, wherein the first set of time frames comprises odd-numbered time frames.

5. The method of reducing co-channel interference in a frame-based broadband wireless communication system of claim 1, wherein the second set of time frames comprises even-numbered time frames.

6. The method of reducing co-channel interference as set forth in claim 1, wherein a net uplink/downlink ratio comprises a 1/N ratio, wherein N is a positive number.

7. The method of reducing co-channel interference as set forth in claim 6, wherein the net uplink/downlink ratio is determined from a downlink average spectrum efficiency and an uplink average spectrum efficiency.

8. The method of reducing co-channel interference as set forth in claim 6, wherein the net uplink/downlink ratio is determined from an $R_d$ value and an $R_u$ value, and wherein the $R_d$ value comprises a first fractional part of a time frame that is dedicated for the downlink and the $R_u$ value comprises a second fractional part of a time frame that is dedicated for the uplink.

9. The method of reducing co-channel interference as set forth in claim 8, wherein the $R_d$ value is calculated in accordance with the following formula:

$$R_d=1/[(S_d/S_u)/(T_d/T_u)+1],$$

and wherein, $S_d$=a spectrum efficiency for the downlink;

$S_u$=a spectrum efficiency for the uplink;

$T_d$=time slots allocated by the system on the downlink; and $T_u$=time slots allocated by the system on the uplink.

10. The method of reducing co-channel interference as set forth in claim 9, wherein the $R_u$ value is calculated in accordance with the following formula:

$$R_u=1-R_d.$$

11. The method of reducing co-channel interference as set forth in claim 8, wherein the $R_d$ value is calculated in accordance with the following formula:

$$R_d=1/[(S_d/S_u)/(T_d/T_u/2)+1],$$

and wherein, $S_d$=a spectrum efficiency for the downlink;

$S_u$=a spectrum efficiency for the uplink;

$T_d$=time slots allocated by the system on the downlink; and $T_u$=time slots allocated by the system on the uplink.

12. The method of reducing co-channel interference as set forth in claim 1, wherein the communication system comprises an Adaptive Time Division Duplexing (ATDD) communication system.

13. The method of reducing co-channel interference as set forth in claim 1, wherein the step (a) of determining a set of terminal stations comprises the sub-steps of:

i) determining an operating property set for a selected sector of the selected base station; and ii) determining a set of terminal stations that comprise the operating property set of the selected sector.

14. The method of reducing co-channel interference as set forth in claim 13, wherein the operating property set comprises a polarization, a frequency and a base station antenna direction.

15. The method of reducing co-channel interference as set forth in claim 13, wherein the set of terminal stations includes terminal stations that are associated with sectors of at least one base station.

16. The method of reducing co-channel interference as set forth in claim 1, wherein the step (a) of determining a set of terminal stations comprises the sub-steps of:

i) determining a polarization and a frequency of a communication signal and determining an antenna direction for a selected sector of the selected base station; and ii) determining a set of terminal stations that include polarizations and frequencies of the communication signal similar to those determined in sub-step (i) and that also include a similar antenna direction for the selected sector as that determined in sub-step (i).

17. The method of reducing co-channel interference as set forth in claim 1, wherein the communication system includes a communication re-use scheme having a frequency re-use factor of 2, a 2-frequency set and having a 4 sectors-per-cell configuration.

18. The method of reducing co-channel interference as set forth in claim 1, wherein the communication system includes a communication re-use scheme having a frequency re-use factor of 2, a 1-frequency set and having a 4 sectors-per-cell configuration.

19. The method of reducing co-channel interference as set forth in claim 1, wherein the communication system includes a communication re-use scheme using a frequency re-use factor of 2, a 3-frequency set and having a 6 sectors-per-cell configuration.

20. The method of reducing co-channel interference as set forth in claim 1, wherein the communication system includes a communication re-use scheme using a frequency re-use factor of 3/2, a 4-frequency set and having a 6 sectors-per-cell configuration.

21. An apparatus for reducing co-channel interference in a frame-based broadband wireless communication system, wherein the communication system comprises a plurality of base stations and a plurality of terminal stations, wherein each terminal station is associated with at least one base station, and wherein each base station has an associated and corresponding cell, wherein each cell includes a plurality of associated and corresponding sectors, and wherein the plurality of base stations use frame-synchronized communication, and wherein the communication system comprises an uplink and a downlink, and wherein the uplink comprises an uplink signal divided into a plurality of time frames, and wherein each time frame has an associated and corresponding frame number, comprising:

a) a set determining means for determining a set of terminal stations that may potentially interfere with a selected base station;

b) a diagonal subset determining means for determining a geographically diagonal subset of the set of terminal stations, wherein the diagonal subset communicates with a first set of associated and corresponding base stations that are approximately diagonal to the selected base station;

c) a non-diagonal subset determining means for determining a geographically non-diagonal subset of the set of terminal stations, wherein the non-diagonal subset communicates with a second set of associated and corresponding base stations that are not approximately diagonal to the selected base station;

d) a first allocating means for allocating a first set of time frames for the first set of base stations;

e) a second allocating means for allocating a second set of time frames for the second set of base stations;

f) a first transmitting means for transmitting uplink information from terminal stations associated with the first set of base stations during the first set of time frames; and a second transmitting means for transmitting uplink information from terminal stations associated with the second set of base stations during the second set of time frames.

22. A frame-based broadband wireless communication system for reducing co-channel interference, comprising:

a) a plurality of base stations for transmitting and receiving communication signals within a cell;

b) a base station controller, operatively coupled to the plurality of base stations, for controlling the plurality of base stations;

c) a general purpose computer, operatively connected to the base station controller, for:

i)determining a set of terminal stations that may potentially interfere with a selected base station;

ii) determining a geographically diagonal subset of the set of terminal stations, wherein the diagonal subset communicates with a first set of associated and corresponding base stations that are approximately diagonal to the selected base station;

iii) determining a geographically non-diagonal subset of the set of terminal stations, wherein the non-diagonal subset communicates with a second set of associated and corresponding base stations that are not approximately diagonal to the selected base station;

iv) allocating a first set of time frames for the first set of base stations;

v) allocating a second set of time frames for the second set of base stations; and d) a plurality of terminal stations, communicatively coupled to at least one of the plurality of base stations, for transmitting and receiving communication signals within the cell.

*23. A wireless communication system, comprising:*

*a plurality of base stations to transmit and/or receive communication signals within cells; and*

*a base station controller, operatively coupled to said plurality of base stations, to:*

*determine a set of terminal stations that potentially interfere with reception at a selected base station from a terminal station in a line of sight of a sector associated with the selected base station, wherein one or more of said terminal stations operates on a same frequency as the selected base station, a same polarization as the selected base station and/or comprises an antenna facing the selected base station;*

*determine a first subset of the set of terminal stations, wherein the first subset communicates with a first set of associated base stations that are approximately located along a ray that substantially intersects the selected base station and that is oblique and/or perpendicular to the line of sight of the sector;*

*determine a second subset of the set of terminal stations, wherein the second subset communicates with a second set of associated base stations including one or more base stations that are not approximately located along the ray that substantially intersects the selected base station;*

*determine a first set of time frames for the first subset of the set of terminal stations; and*

*determine a second set of time frames for the second subset of the set of terminal stations,*

*wherein the first subset and the second subset of the set of terminal stations respectively transmit uplink information during the first set of time frames and the second set of time frames.*

*24. The wireless communication system of claim 23, further comprising:*

*a communication hub to provide one or more communication services to customers; and*

*a video server to provide a video service to at least one of said customers through said communication hub.*

*25. The wireless communication system of claim 24, further comprising:*

*a plurality of customer premises equipment (CPE) stations to deliver said one or more communication services to said customers; and*

*at least one residential gateway coupled to one of said CPE stations.*

*26. The wireless communication system of claim 24, wherein the communication hub further comprises at least one ATM switch to provide at least one ATM service to one or more of said customers.*

*27. The wireless communication system of claim 26, wherein said at least one ATM service includes at least one of a video service, a voice service and a data service.*

*28. The wireless communication system of claim 23, wherein the selected base station further comprises a sectored active antenna array.*

*29. A wireless communication system, comprising:*

*a plurality of base stations to transmit and/or receive communication signals within cells;*

*a base station controller to control two or more of said plurality of base stations; and*

*a general purpose computer, coupled to the base station controller, to:*

*determine a set of terminal stations that potentially interfere with reception at a selected base station*

*from a terminal station in a line of sight of a sector associated with the selected base station, wherein one or more of said terminal stations operates on a same frequency as the selected base station, a same polarization as the selected base station and/or comprises an antenna facing the selected base station;*

*determine a first subset of the set of terminal stations, wherein the first subset communicates with a first set of associated base stations that are approximately located along a ray that substantially intersects the selected base station and that is oblique and/or perpendicular to the line of sight of the sector;*

*determine a second subset of the set of terminal stations, wherein the second subset communicates with a second set of associated and corresponding base stations including one or more base stations that are not approximately located along the ray that substantially intersects the selected base station;*

*determine a first set of time frames for the first subset of the set of terminal stations; and*

*determine a second set of time frames for the second subset of the set of terminal stations,*

*wherein the first subset and the second subset of the set of terminal stations respectively transmit uplink information during the first set of time frames and the second set of time frames.*

*30. A method, comprising:*

*identifying, by a general purpose computer, a set of one or more terminal stations that potentially interfere with reception at a selected base station from a terminal station in a line of sight of a sector associated with the selected base station, wherein the one or more of said terminal stations operates on a same frequency as the selected base station, a same polarization as the selected base station and/or comprises an antenna facing the selected base station;*

*identifying, by said general purpose computer, a first subset of the set of terminal stations, wherein the first subset communicates with a first set of associated base stations that are approximately located along a ray that substantially intersects the selected base station and that is oblique and/or perpendicular to the line of sight of the sector;*

*identifying, by said general purpose computer, a second subset of the set of terminal stations, wherein the second subset of terminal stations communicates with a second set of associated base stations including one or more base stations that are not approximately located along the ray that substantially intersects the selected base station;*

*determining a first set of time frames for the first subset of the set of terminal stations; and*

*determining a second set of time frames for the second subset of the set of terminal stations,*

*wherein the first subset and the second subset of the set of terminal stations respectively transmit uplink information during the first set of time frames and the second set of time frames.*

*31. The method of claim 30, wherein said selected base station and said terminal station in the line of sight of the sector associated with the selected base station communicate using a half-duplex frequency-division duplexed (FDD) communication system.*

*32. The method of claim 30, wherein said selected base station and said terminal station in the line of sight of the sector associated with the selected base station communicate using a time-division duplexed (TDD) system.*

*33. The method of claim 30, wherein said selected base station and said terminal station in the line of sight of the sector associated with the selected base station using a frame-synchronized communication system that transmits information in an uplink signal and a downlink signal, said uplink signal being partitioned into sequentially numbered time frames.*

*34. The method of claim 30, wherein said selected base station and said terminal station in the line of sight of the sector associated with the selected base station communicate using an Adaptive Time Division Duplexing (ATDD) communication system.*

* * * * *

UNITED STATES PATENT AND TRADEMARK OFFICE

CERTIFICATE OF CORRECTION

PATENT NO. : RE42,068 E
APPLICATION NO. : 11/377891
DATED : January 25, 2011
INVENTOR(S) : Klein et al.

It is certified that error appears in the above-identified patent and that said Letters Patent is hereby corrected as shown below:

Page 2, item (56), under "Other Publications", in Column 2, Line 7, delete "mail" and insert -- mailed --.

Column 19, line 67, in Claim 10, delete "$R_u$=1–$R_d$." and insert -- $R_u$=1–$R_{d-}$ --.

Column 21, line 47, in Claim 22, delete "i)determining" and insert -- i) determining --.

Signed and Sealed this
Twenty-fourth Day of May, 2011

David J. Kappos

David J. Kappos
*Director of the United States Patent and Trademark Office*